United States Patent
Sotudeh Gharebagh et al.

(10) Patent No.: US 12,164,550 B2
(45) Date of Patent: Dec. 10, 2024

(54) TRAINING A MODEL FOR PERFORMING ABSTRACTIVE TEXT SUMMARIZATION

(71) Applicant: Adobe Inc., San Jose, CA (US)

(72) Inventors: Sajad Sotudeh Gharebagh, Arlington, VA (US); Hanieh Deilamsalehy, Seattle, WA (US); Franck Dernoncourt, San Jose, CA (US)

(73) Assignee: Adobe Inc., San Jose, CA (US)

( * ) Notice: Subject to any disclaimer, the term of this patent is extended or adjusted under 35 U.S.C. 154(b) by 415 days.

(21) Appl. No.: 17/651,352

(22) Filed: Feb. 16, 2022

(65) Prior Publication Data
US 2023/0259544 A1 Aug. 17, 2023

(51) Int. Cl.
*G06F 40/30* (2020.01)
*G06F 16/33* (2019.01)
(Continued)

(52) U.S. Cl.
CPC ........ *G06F 16/345* (2019.01); *G06F 16/3334* (2019.01); *G06F 18/217* (2023.01);
(Continued)

(58) Field of Classification Search
CPC .......... G06N 3/045; G06N 3/08; G06N 3/044; G06N 3/04; G06F 40/30; G06F 16/345;
(Continued)

(56) References Cited

U.S. PATENT DOCUMENTS 10,019,525 B1 * 7/2018 Boni ................... G06F 16/9038
10,885,436 B1 * 1/2021 Saleh ....................... G06N 3/08
(Continued)

OTHER PUBLICATIONS

Akiyama, K. et al. "Hie-BART: Document Summarization with Hierarchical BART", Proc. of the 2021 Conference of the North American Chapter of the Association for Computational Linguistics: Student Research Workshop, pp. 159-165, Jun. 2021, doi: 10.18653/v1/2021.naacl-srw.20.
(Continued)

*Primary Examiner* — Jakieda R Jackson
(74) *Attorney, Agent, or Firm* — Weaver Austin Villeneuve & Sampson LLP

(57) ABSTRACT

Techniques for training for and performing abstractive text summarization are disclosed. Such techniques include, in some embodiments, obtaining textual content, and generating a reconstruction of the textual content using a trained language model, the reconstructed textual content comprising an abstractive summary of the textual content generated based on relative importance parameters associated with respective portions of the textual content. In some cases, the trained language model includes a neural network language model that has been trained by identifying a plurality of discrete portions of training textual content, receiving the plurality of discrete portions of the training textual content as input to the language model, and predicting relative importance parameters associated with respective ones of the plurality of discrete portions of the training textual content, the relative importance parameters each being based at least on one or more linguistic similarity measures with respect to a ground truth.

19 Claims, 11 Drawing Sheets

(51) Int. Cl.
*G06F 16/34* (2019.01)
*G06F 18/21* (2023.01)
*G06F 18/22* (2023.01)
*G06N 3/04* (2023.01)
*G06N 3/08* (2023.01)

(52) U.S. Cl.
CPC .............. *G06F 18/22* (2023.01); *G06N 3/04* (2013.01); *G06N 3/08* (2013.01)

(58) Field of Classification Search
CPC .... G06F 40/166; G06F 40/284; G06F 16/334; G06F 18/22; G06F 18/217; G06V 10/82; G06V 20/47
See application file for complete search history.

(56) References Cited

U.S. PATENT DOCUMENTS

| | | | |
|---|---|---|---|
| 11,600,194 B2* | 3/2023 | McCann | G06N 3/084 |
| 11,709,690 B2* | 7/2023 | Lipka | G06F 3/04815 715/705 |
| 11,836,467 B2* | 12/2023 | Allamanis | G06F 8/33 |
| 11,868,440 B1* | 1/2024 | Patel | G06V 10/774 |
| 11,972,463 B1* | 4/2024 | Nguyen | G06N 3/088 |
| 11,978,181 B1* | 5/2024 | Pieper | G06T 5/92 |
| 2012/0035912 A1* | 2/2012 | Litvak | G06F 16/345 704/8 |
| 2015/0066711 A1* | 3/2015 | Chua | G06Q 30/00 705/28 |
| 2016/0224803 A1* | 8/2016 | Frank | G06F 21/6245 |
| 2016/0300252 A1* | 10/2016 | Frank | G06F 21/6245 |
| 2017/0249384 A1* | 8/2017 | Kandylas | G06F 16/358 |
| 2018/0300400 A1* | 10/2018 | Paulus | G06N 3/044 |
| 2019/0287012 A1* | 9/2019 | Celikyilmaz | G06F 16/345 |
| 2019/0304157 A1* | 10/2019 | Amer | G06V 40/23 |
| 2019/0362020 A1* | 11/2019 | Paulus | G06F 18/24143 |
| 2019/0377955 A1* | 12/2019 | Swaminathan | H04N 21/23418 |
| 2020/0082270 A1* | 3/2020 | Gu | G06N 3/045 |
| 2020/0242299 A1* | 7/2020 | Ekmekci | G06F 40/30 |
| 2021/0064956 A1* | 3/2021 | Zhiltsov | G06F 17/18 |
| 2021/0089841 A1* | 3/2021 | Mithun | G06T 7/90 |
| 2021/0103829 A1* | 4/2021 | Barshan | G06N 20/10 |
| 2021/0133535 A1* | 5/2021 | Zhao | G06N 3/04 |
| 2021/0157829 A1* | 5/2021 | Boni | G06F 17/18 |
| 2021/0365773 A1* | 11/2021 | Subramanian | G06F 40/166 |
| 2022/0084310 A1* | 3/2022 | Thyagharajan | G06V 10/774 |
| 2022/0114444 A1* | 4/2022 | Weinzaepfel | G06N 3/08 |
| 2022/0343897 A1* | 10/2022 | Agarwal | G10L 15/063 |
| 2022/0366251 A1* | 11/2022 | Subramanian | G06F 40/166 |
| 2022/0398071 A1* | 12/2022 | Allamanis | G06N 3/084 |
| 2023/0079879 A1* | 3/2023 | Gunasekara | G06N 3/09 704/251 |
| 2023/0122429 A1* | 4/2023 | Gunasekara | G06N 3/08 705/304 |
| 2023/0130974 A1* | 4/2023 | Yao | G06F 40/30 704/9 |
| 2023/0214453 A1* | 7/2023 | Santhar | G06N 3/088 706/12 |

OTHER PUBLICATIONS

Bengio, S. et al. "Scheduled Sampling for Sequence Prediction with Recurrent Neural Networks", Advances in Neural Information Processing Systems 28 (NIPS 2015), vol. 1, pp. 1171-1179, Dec. 2015.
Bengio, Y. et al. "Curriculum Learning", Proc. of the 26th International Conference on Machine Learning (ICML '09), pp. 41-48, Jun. 2009, doi: 10.1145/1553374.1553380.
Cachola, I. et al. "TLDR: Extreme Summarization of Scientific Documents", Findings of the Association for Computational Linguistics: EMNLP 2020, pp. 4766-4777, Nov. 2020, doi: 10.18653/v1/2020.findings-emnlp.428.
Castells, T. et al. "SuperLoss: A Generic Loss for Robust Curriculum Learning", Advances in Neural Information Processing Systems 33 (NeurIPS 2020), Article 362, pp. 4308-4319, Dec. 2020.
Celikyilmaz, A. et al. "Deep Communicating Agents for Abstractive Summarization", Proc. of the 2018 Conference of the North American Chapter of the Association for Computational Linguistics: Human Language Technologies, vol. 1 (Long Papers), pp. 1662-1675, Jun. 2018, doi: 10.18653/v1/N18-1150.
Chang, E. et al. "Does the Order of Training Samples Matter? Improving Neural Data-to-Text Generation with Curriculum Learning", Proc. of the 16th Conference of the European Chapter of the Association for Computational Linguistics: Main Volume, pp. 727-733, Apr. 2021, doi: 10.18653/v1/2021.eacl-main.61.
Chen, X. et al. "EarlyBERT: Efficient BERT Training via Early-bird Lottery Tickets", Proc. of the 59th Annual Meeting of the Association for Computational Linguistics and the 11th International Joint Conference on Natural Language Processing, vol. 1: Long Papers, pp. 2195-2207, Aug. 2021, doi: 10.18653/v1/2021.acl-long.171.
Chen, Y. et al. "Multi-Task Learning for Abstractive and Extractive Summarization", Data Science and Engineering, 4:14-23, 2019, doi: 10.1007/s41019-019-0087-7.
Cho, S. et al. "StreamHover: Livestream Transcript Summarization and Annotation", Proc. of the 2021 Conference on Empirical Methods in Natural Language Processing, pp. 6457-6474, Nov. 2021, doi: 10.18653/v1/2021.emnlp-main.520.
Cohan, A. et al. "Revisiting Summarization Evaluation for Scientific Articles", Proc. of the Tenth International Conference on Language Resources and Evaluation (LREC '16), pp. 806-813, May 2016.
Devlin J., et al., "BERT: Pre-Training of Deep Bidirectional Transformers for Language Understanding", Proc. of NAACL-HLT 2019, Available online at: https://arxiv.org/pdf/1810.04805.pdf, May 24, 2019, 16 pages.
Doshi, K. "Transformers Explained Visually (Part 1): Overview of Functionality", Towards Data Science, Jun. 2, 2021 [online]. URL: https://towardsdatascience.com/transformers-explained-visually-part-1-overview-of-functionality-95a6dd460452 [retrieved Jul. 1, 2022].
Doshi, K. "Transformers Explained Visually (Part 3): Multi-head Attention, deep dive", Towards Data Science, Jun. 2, 2021 [online]. URL: https://towardsdatascience.com/transformers-explained-visually-part-3-multi-head-attention-deep-dive-1c1ff1024853 [retrieved Jul. 1, 2022].
Elman, J. "Learning and development in neural networks: the importance of starting small", Cognition, 48:71-99, 1993, doi: 10.1016/0010-0277(93)90058-4.
Fabbri, A. R. et al. "SummEval: Re-evaluating Summarization Evaluation", Transactions of the Association for Computational Linguistics, 9:391-409, Apr. 2021, doi: 10.1162/tacl_a_00373.
Galassi, A. et al. "Attention in Natural Language Processing", IEEE Transactions on Neural Networks and Learning Systems, 32(10):4291-4308, Oct. 2021, doi: 10.1109/TNNLS.2020.3019893.
Ganesan, K. "What is ROUGE and how it works for evaluation of summaries?", Jan. 25, 2017 [online]. URL: https://kavita-ganesan.com/what-is-rouge-and-how-it-works-for-evaluation-of-summaries/#.Yr8RgnbMld8 [retrieved Jul. 1, 2022].
Gehrmann, S. et al. "Bottom-Up Abstractive Summarization", Proc. of the 2018 Conference on Empirical Methods in Natural Language Processing, pp. 4098-4109, 2018, doi: 10.18653/v1/D18-1443.
Gong, L. et al. "Efficient Training of BERT by Progressively Stacking", Proc. of the 36th International Conference on Machine Learning, PMLR 97:2337-2346, 2019.
Grusky, M. et al. "Newsroom: A Dataset of 1.3 Million Summaries with Diverse Extractive Strategies", Proc. of NAACL-HLT 2018, arXiv: 1804.11283v2 [cs.CL], May 17, 2020.
Haffari, G. et al. "Active Learning for Statistical Phrase-based Machine Translation", Proc. of Human Language Technologies: The 2009 Annual Conference of the North American Chapter of the Association for Computational Linguistics, pp. 415-423, Jun. 2009.
Hochreiter, S. et al. "Long Short-Term Memory", Neural Computation, 9(8):1735-1780, 1997 doi: 10.1162/neco.1997.9.8.1735.
Hsu, W-T. et al. "A Unified Model for Extractive and Abstractive Summarization using Inconsistency Loss", Proc. of the 56th Annual Meeting of the Association for Computational Linguistics, vol. 1 (Long Papers), pp. 132-141, Jul. 2018, doi: 10.18653/v1/P18-1013.
Kim, B. et al. "Abstractive Summarization of Reddit Posts with Multi-level Memory Networks", Proc. of the 2019 Conference of

(56) References Cited

OTHER PUBLICATIONS the North American Chapter of the Association for Computational Linguistics: Human Language Technologies, vol. 1 (Long and Short Papers), pp. 2519-2531, Jun. 2019, doi: 1018653/v1/N19-1260.

Landis, J. R. et al. "The Measurement of Observer Agreement for Categorical Data", Biometrics, 33(1):159-174, Mar. 1977.

Lebanoff, L. et al. "Adapting the Neural Encoder-Decoder Framework from Single to Multi-Document Summarization", Proc. of the 2018 Conference on Empirical Methods in Natural Language Processing, pp. 4131-4141, 2018, doi: 10.18653/v1/D18-1446.

Lewis, M. et al. "BART: Denoising Sequence-to-Sequence Pretraining for Natural Language Generation, Translation, and Comprehension", Proc. of the 58th Annual Meeting of the Association for Computational Linguistics, pp. 7871-7880, Jul. 2020, doi: 10.18653/v1/2020.acl-main.703.

Lin, C-Y. "ROUGE: A Package for Automatic Evaluation of Summaries". In Text Summarization Branches Out, pp. 74-81, Jul. 2004, Association for Computational Linguistics.

Liu, Y. et al. "RoBERTa: A Robustly Optimized BERT Pretraining Approach", arXiv:1907.11692v1 [cs.CL] (preprint), Jul. 26, 2019.

Liu, Y. et al. "Text Summarization with Pretrained Encoders", Proc. of the 2019 Conference on Empirical Methods in Natural Language Processing and the 9th International Joint Conference on Natural Language Processing (EMNLP-IJCNLP), pp. 3730-3740, Nov. 2019, doi: 10.18653/v1/D19-1387.

Loshchilov, I. et al. "Decoupled Weight Decay Regularization", Proc. of the 7th International Conference on Learning Representations (ICLR 2019), May 2019.

MacAvaney, S. et al. "Ontology-Aware Clinical Abstractive Summarization", Proc. of the 42nd International ACM SIGIR Conference on Research and Development in Information Retrieval (SIGIR'19), arXiv:1905.05818v1 [cs.CL], May 21, 2020.

MacAvaney, S. et al. "Training Curricula for Open Domain Answer Re-Ranking", Proc. of the 43rd International ACM SIGIR Conference on Research and Development in Information Retrieval (SIGIR'20), arXiv:2004.14269v2 [cs.IR], May 14, 2019.

Nallapati, R. et al. "SummaRuNNer: A Recurrent Neural Network Based Sequence Model for Extractive Summarization of Documents", Proc. of the Thirty-First AAAI Conference on Artificial Intelligence (AAAI-17), pp. 3075-3081, Feb. 2017.

Narayan, S. et al. "Don't Give Me the Details, Just the Summary! Topic-Aware Convolutional Neural Networks for Extreme Summarization", Proc. of the 2018 Conference on Empirical Methods in Natural Language Processing, pp. 1797-1807, 2018, doi: 10.18653/v1/D18-1206.

Narayan, S. et al. "Stepwise Extractive Summarization and Planning with Structured Transformers", Proc. of the 2020 Conference on Empirical Methods in Natural Language Processing, pp. 4143-4159, Nov. 2020, doi: 10.18653/v1/2020.emnlp-main.339.

Ng, J-P. et al. "Better Summarization Evaluation with Word Embeddings for ROUGE", Proc. of the 2015 Conference on Empirical Methods in Natural Language Processing, pp. 1925-1930, Sep. 2015, doi: 10.18653/v1/D15-1222.

Nguyen, T. et al. "Enriching and Controlling Global Semantics for Text Summarization", Proc. of the 2021 Conference on Empirical Methods in Natural Language Processing, pp. 9443-9456, Nov. 2021, doi: 10.18653/v1/2021.emnlp-main.744.

Peters, M. E. et al. "Deep contextualized word representations", Proc. of the 2018 Conference of the North American Chapter of the Association for Computational Linguistics: Human Language Technologies, vol. 1 (Long Papers), pp. 2227-2237, Jun. 2018, doi: 10.18653/v1/N18-1202.

Platanios, E. A. et al. "Competence-based Curriculum Learning for Neural Machine Translation", Proc. of the 2019 Conference of the North American Chapter of the Association for Computational Linguistics: Human Language Technologies, vol. 1 (Long and Short Papers), pp. 1162-1172, Jun. 2019, doi: 10.18653/v1/N19-1119.

Saxena, S. et al. "Data Parameters: A New Family of Parameters for Learning a Differentiable Curriculum", Advances in Neural Information Processing Systems 32 (NeurIPS 2019), pp. 11093-11103, Dec. 2019.

See, A. et al. "Get to the Point: Summarization with Pointer-Generator Networks", Proc. of the 55th Annual Meeting of the Association for Computational Linguistics (ACL), arXiv:1704.04368v2 [cs.CL], Apr. 25, 2017.

Sotudeh Gharebagh, S. et al. "Attend to Medical Ontologies: Content Selection for Clinical Abstractive Summarization", Proc. of the 58th Annual Meeting of the Association for Computational Linguistics, pp. 1899-1905, Jul. 2020, doi: 10.18653/v1/2020.acl-main.172.

Tay, Y. et al. "Simple and Effective Curriculum Pointer-Generator Networks for Reading Comprehension over Long Narratives", Proc. of the 57th Annual Meeting of the Association for Computational Linguistics, pp. 4922-4931, Jul. 2019, doi: 10.18653/v1/P19-1486.

Vaswani, A. et al. "Attention is All You Need", Workshop at the 31st Conference on Neural Information Processing Systems (NeurIPS), arXiv:1706.03762v5 [cs.CL], Dec. 6, 2017.

Volske, M. et al. "TL;DR: Mining Reddit to Learn Automatic Summarization", Proc. of the Workshop on New Frontiers in Summarization, pp. 59-63, Sep. 2017. doi: 10.18653/v1/W17-4508.

Weights & Biases (company website). URL: https://wandb.ai/site [accessed: Jul. 1, 2022].

Wolf, T. et al. "Transformers: State-of-the-Art Natural Language Processing", Proc. of the 2020 Conference on Empirical Methods in Natural Language Processing, pp. 38-45, Oct. 2020, doi: 10.18653/v1/2020.emnlp-demos.6.

Xiao, W. et al. "Extractive Summarization of Long Documents by Combining Global and Local Context", Proc. of the 2019 Conference on Empirical Methods in Natural Language Processing and the 9th International Joint Conference on Natural Language Processing (EMNLP-IJCNLP), pp. 3011-3021, Nov. 2019, doi: 10.18653/v1/D19-1298.

Xu, B. et al. "Curriculum Learning for Natural Language Understanding", Proc. of the 58th Annual Meeting of the Association for Computational Linguistics, pp. 6095-6104, Jul. 2020, doi: 10.18653/v1/2020.acl-main.542.

Xu, J. et al. "Discourse-Aware Neural Extractive Text Summarization", Proc. of the 58th Annual Meeting of the Association for Computational Linguistics, pp. 5021-5031, Jul. 2020, doi: 10.18653/v1/2020.acl-main.451.

Zhang, J. et al. "PEGASUS: Pre-training with Extracted Gap-sentences for Abstractive Summarization", Proc. of the 37th International Conference on Machine Learning (ICML '20), PMLR 119:11328-11339, Jul. 2020.

Zhang, Y. et al. "Optimizing the Factual Correctness of a Summary: A Study of Summarizing Radiology Reports", Proc. of the 58th Annual Meeting of the Association for Computational Linguistics, pp. 5108-5120, Jul. 2020, doi: 10.18653/v1/2020.acl-main.458.

Zou, Y. et al. "Pre-training for Abstractive Document Summarization by Reinstating Source Text", Proc. of the 2020 Conference on Empirical Methods in Natural Language Processing, pp. 3646-3660, Nov. 2020, doi: 10.18653/v1/2020.emnlp-main.297.

* cited by examiner

102 —

Source. Girlfriend has major triggers with my past, she's been diplomatic with it. Tonight we're supposed to go out together since she generally doesn't have Fridays off. She's tired and not feeling great, so I go out and pick up dinner for us at a place of her choice. We're watching a movie, we pause it while we laugh at a line in "American hustle" (so you bought me a science oven?"). I post it on her wall on Facebook, and I switch to my phones desktop that has my calendar on it. She sees my ex's birthday, and it immediately erupts into a fight. I try to explain that google sync puts things back on my calendar at will, even when deleted, if I don't remember to delete it from every calendar location I have (work, Gmail, home). Doesn't matter 108
110
112
110

104 —

Prior model - Google sync puts things back on my calendar at will, even when deleted, if I don't remember to delete them.

112

106 —

Ground truth. I delete ex's birthday, google sync puts it back, gf sees it and flips 110
108

FIG. 1

| | |
|---|---|
| Source | "tifu because i had the hubris to believe that my trusty flash drive i keep on me every second of every day would never jump ship.</s><s> subsequently this hubris made me lazy and i didn't back up my files on my flash drive to my computer, or drive, or cloud.</s><s> i'm a senior in a design college about to graduate in a few months, and i'm currently in my portfolio class where we are meant to composite all our design work and make ourselves marketable.</s><s> well, i got back into town from a trip yesterday and immediately went to the grocery store.</s><s> in the parking lot my flash drive fell out of my floppy bag.</s><s> i saw it and put it back in.</s><s> this was the last time i saw it.</s><s> i then went to a class building to work on pottery, then to a friend's house, second friend's house, then to my house.</s><s> woke up the next day and saw my flash drive wasn't in my purse, wasn't in my second purse, wasn't in my backpack, my car, you name it.</s><s> i've asked around.</s><s> but i'm now going to spend the rest of my day looking for it or else there's going to be no point of being in college.</s><s> if i don't find it, i think i'm going to drop out, move towns, change my name, and life calling.</s><s> don't tell me i shouldn't." |
| Baseline Model | "i had the hubris to believe that my trusty flash drive would never jump ship, lost my flash drive" |
| Example Model 1 | "i lost my flash drive and i'm moving towns" |
| Example Model 2 | "i lost my flash drive and now i'm scared i might drop out of college." |
| Human | "i didn't think i would ever lose my flash drive so i got lazy and didn't back it up. i did lose it and now all my work i was going to use to graduate college this spring, create a portfolio, and get a job, is gone." |

FIG. 4

TRAINING A MODEL FOR PERFORMING ABSTRACTIVE TEXT SUMMARIZATION

BACKGROUND

1. Field of Disclosure

The present disclosure relates generally to the fields of semantic processing and machine learning, and more particularly, to abstractive summarization of textual content.

SUMMARY

Techniques for training for and performing abstractive text summarization are disclosed. Such techniques include, in some embodiments, obtaining textual content, and generating a reconstruction of the textual content using a trained language model, the reconstructed textual content including an abstractive summary of the textual content generated based on relative importance parameters associated with respective portions of the textual content. In some cases, the trained language model includes a neural network language model that has been trained by identifying a plurality of discrete portions of training textual content, receiving the plurality of discrete portions of the training textual content as input to the language model, and predicting relative importance parameters associated with respective ones of the plurality of discrete portions of the training textual content, the relative importance parameters each being based at least on one or more linguistic similarity measures with respect to a ground truth.

In one aspect of the present disclosure, a method of performing abstractive summarization of textual content is disclosed. In some embodiments, the method includes obtaining textual content; and generating a reconstruction of the textual content using a trained language model.

In some variants, the trained language has been trained by: identifying a plurality of discrete portions of training textual content; receiving the plurality of discrete portions of the training textual content as input to the language model; and predicting relative importance parameters associated with respective ones of the plurality of discrete portions of the training textual content.

In some implementations, the relative importance parameters each are based at least on one or more linguistic similarity measures with respect to a ground truth, the relative importance parameters each correlating to a probability of a saliency of a respective discrete portion.

In another aspect of the present disclosure, a method of training a language model for abstractive summarization of textual content is disclosed. In some embodiments, the method includes: obtaining a plurality of samples of textual content; determining a difficulty metric associated with each sample of the plurality of samples; and training the language model using the plurality of samples, the trained language model configured to generate a reconstruction of the textual content. In some embodiments, the training includes: up-weighting a sample when the difficulty metric is below a threshold; and visiting the up-weighted sample prior to one or more other ones of the plurality of samples.

In another aspect of the present disclosure, a language transformer system is disclosed. In some embodiments, the system includes: one or more processors; a non-transitory computer-readable medium including a plurality of instructions; and a neural network coupled to the one or more processors and the non-transitory computer-readable medium, the neural network implemented by a language model to: obtain textual content; and generate an abstractive summary of the textual content, the abstractive summary including a reconstruction of the obtained textual content.

In some variants, the language model has been trained by: obtaining a plurality of samples of textual content; determining a difficulty metric associated with each sample of the plurality of samples; and training the language model using the plurality of samples, the trained language model configured to generate a reconstruction of the textual content.

In some implementations, the training includes: up-weighting a sample when the difficulty metric is below a threshold; and visiting the up-weighted sample prior to one or more other ones of the plurality of samples.

In another aspect of the present disclosure, a non-transitory computer-readable apparatus is disclosed.

BRIEF DESCRIPTION OF THE DRAWINGS

FIG. 1 is an example that shows a comparison among a source text, a summary generated by a prior language model, and ground-truth summary, illustrating abstractive summarization of textual content performed by the existing art.

FIG. 4 is an example that shows a comparison among a source text, an abstractive summary generated by a prior language model, abstractive summaries generated by models trained according to the methods descried herein, and ground-truth summary by a human annotator.

Like reference numbers and designations in the various drawings indicate like elements.

DETAILED DESCRIPTION OF EMBODIMENTS

Figure 2:
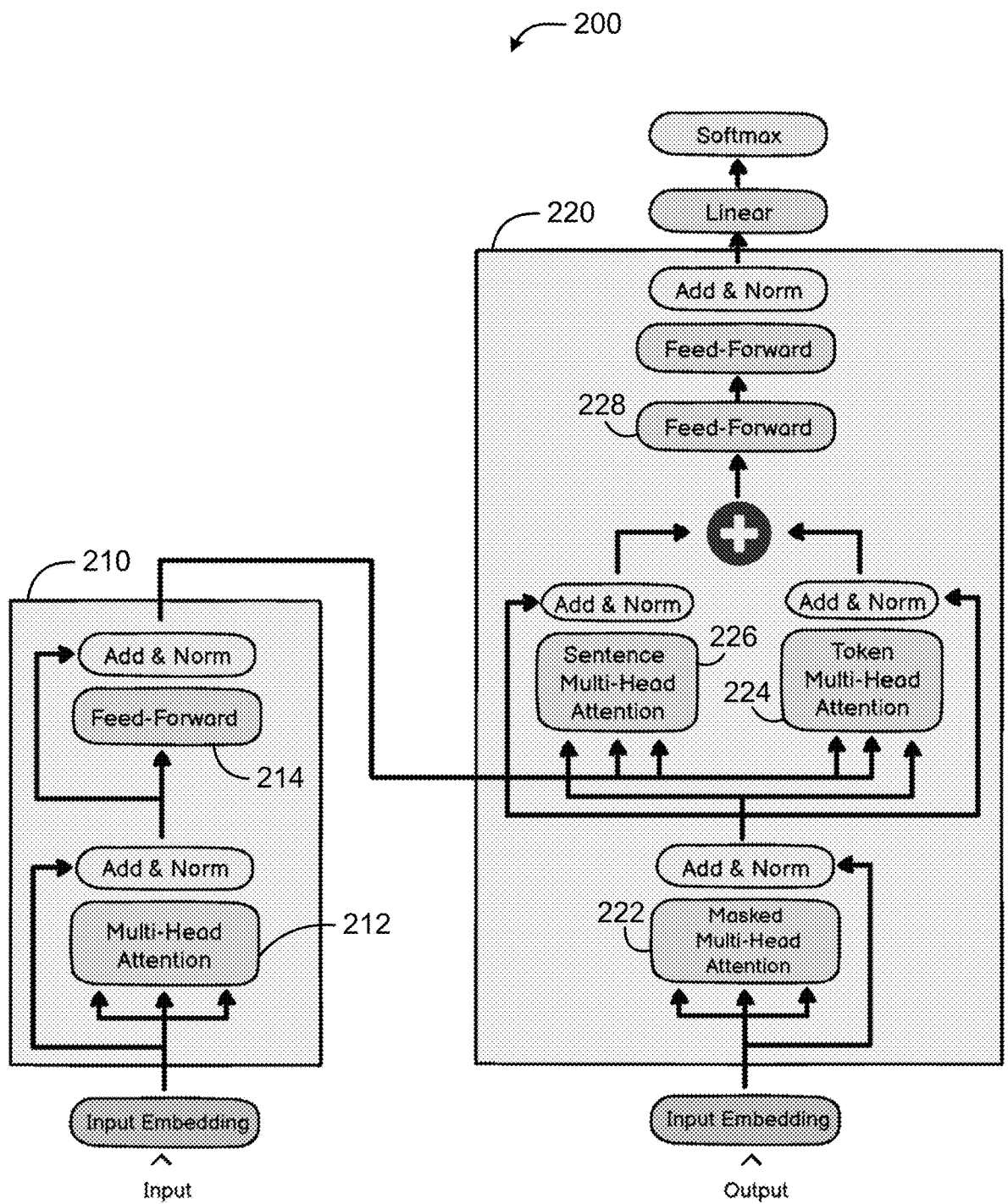
FIG. 2 is a block diagram illustrating an encoder-decoder transformer architecture, according to some embodiments.

Conventional transformer-based models for abstractive text summarization have provided sentence selection and extractive strategies to deal with more complicated tasks such as novel word generation and sentence paraphrasing. However, these models have two shortcomings: (1) They often perform poorly in content selection, and (2) their training strategy lacks efficiency, which restricts model performance.

To these ends, techniques and features to compensate for the foregoing challenges are provided herein. One such feature is a self-attention mechanism that accounts for sentences' relative importance is implemented to enable abstraction to focus on salient sentences. Another such feature is a curriculum learning approach to up-weight easier training samples in the model training process is implemented, bringing about an efficient learning procedure. Qualitative metrics have indicated that embodiments of the architectures and techniques disclosed herein are associated with higher performance than those of existing models and techniques for summarization.

Overview of Encoder-Decoder Transformers

Self-supervised pre-trained language models have gained increased attention given their continued improvements in a variety of natural language processing (NLP) tasks. Different variants of such models are pre-trained on a large amount of unlabeled data, each with various pre-training objectives. Such models are inherently useful for performing language modeling tasks. It has been made possible to fine-tune them on a wide range of downstream NLP tasks, summarization being one of them.

Bidirectional Encoder Representations from Transformers (BERT) is one such transformer-based machine learning technique. More directly, BERT is a language representation model for NLP, and there are variants including BERTSUM for summarization, BERTSUMEXT for extractive summarization, BERTSUMABS for abstractive summarization, and BERTSUMEXTABS which is two-stage fine-tuning approach, exploiting extractive and abstractive objectives. Other related models exist, such as PEGASUS with pre-training objectives specific for text summarization.

The BART model is another model that uses pre-trained encoder and decoder for language generation, unlike BERTSUM, BART is a generalized architecture to pre-trained language models based on a transformer model, combining bidirectional and auto-regressive transformers. BART'S pre-training is divided into two stages: (1) text corruption with an arbitrary noise function, and (2) learning a sequence-to-sequence model to reconstruct the original text. BART has been fine-tuned on a variety of downstream NLP tasks, and it has been shown to be effective when fine-tuned for language generation tasks such as summarization.

Further extensions and improvements to these existing language models are identified and described herein. In some embodiments, a self-attention layer is implemented with a transformer model to account for the relative importance or relevance of text content. In this context, an abstractive summary refers to a rephrased version of a source text which concisely summarizes the essential idea(s) of the source text. Hence, predicting the importance of portions within the source text enhances content selection and thus the abstractive summary. In some embodiments, a curriculum learning architecture is implemented, which up-weights easier training samples in the training process.

To illustrate abstractive summarization of textual content performed by existing art, FIG. 1 is an example that shows a comparison among a source text 102, a summary generated by a prior language model 104, and ground-truth summary 106. Ground truth refers to the ideal expected result, or information that is known to be real or true provided by direct observation and measurement, as opposed to information provided by inference (e.g., by a machine learning model). In the context of summarization, ground truth 106 is a user-generated summary of the source text 102. Put another way, the user-generated summary may also be known as a "too long, didn't read" ("TLDR") summary in some cases, such as message boards, social-media platforms, or other colloquial settings.

FIG. 1 illustrates the shortcoming by the prior language model in content selection. The source text 102 includes a first portion of text in dashed lines 108, a second portion of text in dotted lines 110, and a third portion of text in alternating lines 112. The first portion 108 is picked by the ground truth but skipped by the prior model. The second portion 110 is picked by both the prior model and ground truth. The third portion 112 is picked by the prior model but skipped by ground truth.

While existing models have been shown to be successful in producing abstractive summaries using a pre-trained encoder and decoder, one drawback is in its efficacy in content selection. As can be observed in the FIG. 1 example, while the prior model-generated summary 104 appears to be well written and fluent, it ignores salient source regions and focuses on less important parts of the source. The ground truth 106 reflects a more relevant (to a user) summary of the source text 102 compared to the prior model-generated summary 104. It is more intuitive to users that the first portion 108 is the relevant portion of the source text. However, the prior model has failed to include any reference to those portions.

Referring now to FIG. 2, a block diagram of an encoder-decoder transformer architecture 200 is illustrated, according to some embodiments. In this context, a transformer refers to a computerized architecture configured to receive text as an input sequence and produce another text sequence as output. During training, a transformer takes an input sequence and a target sequence and produces an output sequence, with the goal of producing the target sequence from the input sequence alone during inference. Examples of tasks that the transformer architecture 200 may perform include translation and summarization.

The transformer architecture 200 includes at least one encoder module 210 and at least one decoder module 220. In some embodiments, each encoder 210 includes a multi-head self-attention layer 212 and a feed-forward layer 214. In some embodiments, each decoder 220 includes a multi-head self-attention layer 222, a first self-attention layer 224, a second self-attention layer 226, and a feed-forward layer 228. The self-attention layer 212 is configured to determine a relationship between different portions (e.g., words, sentences) in a text sequence.

In this context, a module refers to at least a portion of computer-executable instructions. In some embodiments, a module is implemented by a hardware processor configured to execute the corresponding computer-executable instructions. A hardware processor is an integrated circuit device associated with a computing device, such as a server or a user device (e.g., a desktop computer, a laptop computer, a tablet computer, a mobile phone, or the like), which is programmable to perform specific tasks. In some embodiments, multiple modules are implemented as a single module. In some embodiments, a single module is implemented as multiple modules. In some embodiments, two or more modules are executable by the same device (e.g., the same server, the same computing device).

In this context, a machine learning model refers to a computational algorithm that indicates relationships between input variables and output variables. In some embodiments, a machine learning model can be trained. Training a machine learning model involves, among other things, determining values of weights associated with the machine learning model, where relationships between the input variables and the output variables are based at least in part on the determined weight values. In one example, a machine learning model is trained in a supervised manner using a training set that includes labeled training data. In a more particular example, the labeled training data includes inputs and manually annotated outputs that the machine learning model is to approximate using determined weight values. In other embodiments, a machine learning model is trained in an unsupervised manner in which weight values are determined without manually labeled training data.

Further, an attention layer is a mechanism configured to enable a machine learning model to relate a word to other words. For example, each word in a sentence may have different attention scores with respect to other words. As another example, each sentence in an input sequence (e.g., source text) may have different attention scores with respect to other sentences in the input sequence. In some embodiments, the input sequence pays attention to itself in the encoder's self-attention 212. The target sequence pays attention to itself in the decoder's self-attention 222. The target sequence pays attention to the input sequence (received from the final encoder in the encoder stack) in the decoder's first self-attention 224 and second self-attention 226. In particular, the first self-attention 224 is configured to relate tokens such as words to each other. For example, the first self-attention 224 is configured to add encoding for the position of words in a text to the encoding for the word. As another example the self-attention 224 convert words to numbers.

In some embodiments, the second self-attention layer 226 advantageously relates sentences within the input sequences to each other (relating positions, encoding to numbers, etc.), inducing the importance of sentences at decoding time, and enabling the disclosed language model to be aware of sentential saliency. More directly, in some embodiments, the first self-attention layer 224 relates to words, and the second self-attention layer 226 specifically relates to sentences and is added to the transformer (e.g., at the decoder 220) so as to enable the language model to learn sentential saliency.

Each attention layer takes its input in the form of three weights or parameters, known as the query, key, and value. On the encoder side 210, an input sequence is fed, and an encoded representation for each word in the input sequence is produced via self-attention 212, incorporating attention scores for each word. On the decoder side 220, the target sequence is fed, and parameters of each word are captured, e.g., meaning and position of each word. An encoded representation for each word in the target sequence is produced via self-attention 222, also incorporating attention scores for each word. The first self-attention layer 224 in the decoder 220 obtains a representation of both the target sequence (from the decoder self-attention) and a representation of the input sequence (from the encoder stack), and adds attention scores into each word's representation. The second self-attention layer 226 performs the same with respect to each sentence's representation. An attention module may repeat its computations multiple times in parallel by splitting query, key, and value parameters, and independently passing them through separate heads, and hence may be referred to as "multi-head attention."

Sentence-Guided Language Models

In some embodiments, a sequence labeling task is defined, where the goal is to predict sentences' relative importance score. The relative importance score allows language models trained according to some embodiments of the present disclosure to learn sentential saliency.

In some embodiments, the relative importance score is defined as a normalized mean of lexical similarity measures. In some embodiments, the relative importance score correlates to a probability of a saliency of a sentence. In some implementations, Recall-Oriented Understudy for Gisting Evaluation (ROUGE) metric or metrics are used in the determination of the relative importance score.

Generally, in this context, ROUGE compares an automatically produced summary of textual content against a reference summary, e.g., human-generated ground truth summary. In a different use cases or implementation of ROUGE, among others, a generated translation may be compared against a reference translation. Various types of ROUGE exist, such as ROUGE-1, which measures precision and recall scores for overlap of unigrams (each word); ROUGE-2, which measures overlap of bigrams (groups of two words); and so on for trigrams and higher-order n-grams (collectively referred to as ROUGE-N). In this context, precision refers to the fraction of relevant instances among the retrieved instances, or in other words, true positive observations over true positive observations and false positive observations. Recall refers to the fraction of relevant instances that were retrieved, or in other words, true positive observations over true positive observations and false negative observations.

Other ROUGE variations include ROUGE-L, which measures the longest matching sequence of words using longest common subsequence (LCS)-based statistics. LCS may refer to the longest subsequence common to all sequences in a set of sequences, takes into account sentence-level structure similarity naturally, and identifies longest co-occurring in-sequence n-grams automatically. LCS does not require consecutive matches but in-sequence matches that reflect sentence-level word order. Other variations exist, such as ROUGE-W, weighted LCS-based statistics that favor consecutive LCSes.

In some embodiments, the relative importance score is defined as the normalized mean of ROUGE-2 and ROUGE-L scores of sentences from a source text with respect to the ground-truth summary:

$$y = \text{relative importance}(s_i) = \frac{RG_{2+L}(s_i)}{\sum_{s_i \in R} RG_{2+L}(s_i)} \quad \text{(Eqn. 1)}$$

where $s_i$ is a sentence in the ith position, R is a set of sentences in the source text, and $RG_{2+L}$ is a function that takes in a source sentence and outputs the mean of its ROUGE-2 and ROUGE-L scores with respect to the ground-truth summary. Put another way, in this scheme, the source sentences' importance is specified, and the ROUGE scores are each a comparison between the source sentences' importance with regard to the ground-truth (human-generated) summary.

In some implementations, the relative importance score is defined is based on other lexical similarity measures. For example, a weighted or normalized mean based on ROUGE-1 and ROUGE-2 scores of sentences from the source text may be determined. As another example, a weighted or normalized mean based on ROUGE-1, ROUGE-2, and ROUGE-L scores of sentences from the source text may be determined. In other examples, other combinations of lexical similarity measures may be used to determine saliency of sentences represented by the relative importance score. In yet other examples, accuracy metrics (e.g., precision, recall, F1 scores) may be used as standalone factors or in conjunction with ROUGE metrics, depending on the desired implementation. In some embodiments, an F1 score can refer to a mean of precision and recall.

In some embodiments, a sequence classification task (e.g., relating to the sentences from the source text) may be initiated using tokens or tags that identify sentences. As an example, an end-of-sentence (EOS) token may be inserted to the end of each input sentence, creating sentences tagged with, e.g., a </s> token. In some implementations, each input sentence may be tagged with a beginning-of-sentence (BOS) token, e.g., an <s> token. In some implementations, each input sentence may be tagged with both a BOS token and an EOS token. That is, an <s> token may be added to the start of the sentence, and a </s> token may be added to the end of the sentence.

In some embodiments, the language model is configured to encode each input associated with one or more tokens (e.g., </s> and/or <s> tokens). In some implementations, an encoding associated with a </s> token represent input sentences' features preceding the token, since the </s> token was added to the end of the sentence. After obtaining representations associated with </s> tokens, the representations may be processed through a linear layer with a sigmoid classifier (e.g., using logistic regression) applied to the language model to output probabilities as the sentences' importance scores. In other implementations, classification algorithms applied to the language model may include Support Vector Machine (SVM), Naive Bayes, Nearest Neighbor (e.g., K-Nearest Neighbor (K-NN)), Random Forest, Gaussian Mixture Model (GMM), Stochastic Gradient Descent, and/or Decision Tree. In some cases, at least a portion of the language model may also include non-classification algorithms such as linear regression.

Formally, the input sequence text may be defined as $R=[sent_1, sent_2, \ldots, sent_i, \ldots, sent_n]$, and $sent_i=[x_{i1}, x_{i2}, \ldots, x_{ij}, \ldots, x_{im}]$. $sent_i$ refers to a sentence in the ith position in the input sequence R. $x_{ij}$ refers to a word in the jth position in $sent_i$. In some embodiments, the input sequence R is framed by adding EOS (e.g., </s>) token to the end of each sentence and adding BOS (e.g., <s>) tokens to the start of each sentence. In some embodiments, the EOS tokens are added without BOS tokens. A modified input sequence R' to a language model is thereby generated. $R'=[<s>sent_1</s><s>sent_2</s> \ldots <s>sent_n</s>]$ is fed through the language model.

In some embodiments, one or more neural networks implemented by the language model is trained to predict the relative importance score y (Eqn. 1). In some implementations, the language model is trained using other accuracy measures, e.g., different ROUGE metrics. By training such a sequence tagger network, an inductive bias is injected to the transformer, more specifically to the encoder (e.g., 210) and the decoder (e.g., 220), such that the source sentences' importance is made aware to the transformer, which enhances the generation of reconstruction (e.g., abstractive summaries) of the input sequence during training and ultimately during inference.

In some embodiments, the training is done in two stages. First, the encoder 210 and the (additional) second self-attention layer 226 are fine-tuned on the sequence tagging problem. Second, the encoder 210 and the second self-attention layer 226 are further fine-tuned on the abstractive summarization task with respect to sentences in the input sequence. Fine-tuning includes (i) pre-training a model (e.g., a neural network model) on a source dataset, (ii) creating a new target model that retains parameters from the pre-trained source model except the output layer, and then (iii) training the target model on a target dataset. The output is trained from scratch, while the parameters are fine-tuned based on the parameters of the source model. In some embodiments, the encoder 210 and the second self-attention layer 226 are fine-tuned with a learning rate selected to stabilize the decoder 220 with more granular gradient steps. One example of the learning rate to stabilize the decoder is $\alpha=3e-5$, although other learning rates may be determined (e.g., empirically) and used. Other possible learning rates (2e-5, 1e-5, etc,) can be used in other implementations.

Accordingly, each of the sentences becomes a discrete portion of the input sequence, enabling the language model to determine the relative importance scores as defined above and thereby gain enhanced awareness of sentential saliency relative to, e.g., the sentences in an input sequence. Sentential saliency advantageously allows the language model to produce reconstructions (e.g., abstractive summarizations) of a source text that are more likely to retain relevant portions of the source text.

Curricular Learning for Language Models

Curriculum learning is a training strategy to improve language model performance and generalization ability based on the idea that easy samples should be visited before difficult ones during the training. When the model starts with easier training examples in the early stages of training, the risk of getting stuck in local optima is reduced as most loss functions in deep neural networks are highly non-convex and hard to converge.

In some embodiments, curriculum learning is applied to a language model to stabilize the training process of the model without ending up in local optima, thereby resulting in more optimal loss values and better fit. A difficulty metric is first defined to measure and distinguish the difficulty of samples during training. In some embodiments, a sample corresponds to at least a portion of the textual content. As one example, a sample may be at least a paragraph of source text. As another example, each sample corresponds to a distinct social media post. To simplify the estimation of a difficulty measure for each sample, embodiments herein discriminate the samples with progressive signals (e.g., using computed loss values) that are emitted for each sample in the training process.

Figure 3:
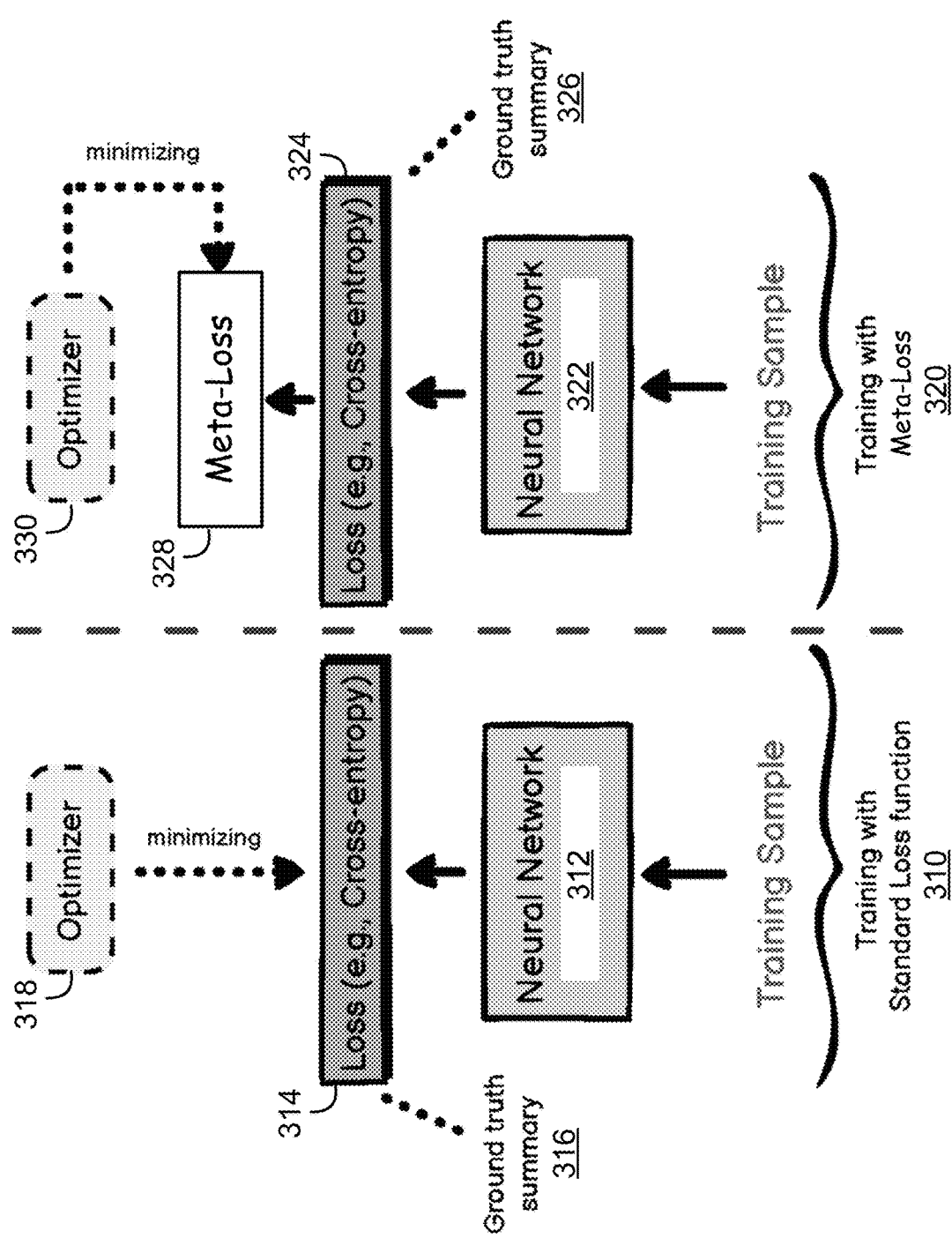
FIG. 3 is a block diagram that illustrates an architectural difference between training with a standard loss function 310 and training with the meta-loss function.

In some embodiments, a "meta-loss" function is applied to determine difficulty. For example, a loss criterion built upon a standard loss function ("task-specific" task loss) is used. FIG. 3 is a block diagram that illustrates an architectural difference between training with a standard loss function 310 and training with the meta-loss function 320.

In training with the standard loss function 310, a training sample is provided to a neural network 312. In some embodiments, the neural network 312 may include a language model such as that configured to perform summarization. Loss (e.g., error) 314 is determined with respect to a ground-truth summary (e.g., human-generated summary) 316, with an optimizer module 318 minimizing the loss 314.

In training with the meta-loss function 320, loss 324 is obtained with respect to ground-truth summary 326 using a neural network 322, similar to the standard loss function 310. However, in some embodiments, a transformed version of the loss is determined and appended on top of existing loss 324, with an optimizer module 330 aiming to minimize the meta-loss 328 instead of the loss 324. The transformation and appending of the loss are described below.

This loss-upon-loss approach (referred to as meta-loss or ML) results in a task-agonstic and confidence-aware loss function, which takes in two parameters: (1) the task loss $\ell(y_i, \hat{y}_i)$ with respect to input i, where $y_i$ is a neural network's output (e.g., the generated summary), and $\hat{y}_i$ is the ground-truth summary (gold label), and (2) $\sigma_i$ as the confidence parameter of input i. The meta-loss is framed as $L_\lambda(\ell_i, \sigma_i)$ and is determined as follows:

$$L_\lambda(\ell_i, \sigma_i) = (\ell_i - \tau)\sigma_i + \lambda(\log \sigma_i)^2 \quad \text{(Eqn. 2)}$$

in which $\lambda$ is the regularization parameter, and $\tau$ is the running or static average of input loss (task loss $\ell$) during the training. In effect, in these implementations, $L_\lambda$ describes the loss of a loss, or in other words, a meta-loss.

While meta-loss can provide a well-defined approach to curriculum learning, learning the confidence parameter $\sigma$ may not be tractable for tasks with abundant training instances, such as text summarization. In some embodiments, to hinder imposing new learnable parameters, a converged value of $\sigma_i$ at the limit may be used:

$$\sigma_i^*(\ell_i) = \arg\min_{\sigma_i} L_\lambda(\ell_i, \sigma_i) \quad \text{(Eqn. 3)}$$

$$ML_\lambda(\ell_i) = L_\lambda(\ell_i, \sigma_\lambda^*(\ell_i, \sigma_i)) = \min_{\sigma_i} L_\lambda(\ell_i, \sigma_i)$$

Using this technique, the confidence parameters are not required to be learned during the training. $\sigma_\lambda^+(\ell_i)$ has a closed-form solution, determined as follows:

$$\sigma_\lambda^*(\ell_i) = e^{-W\left(\frac{1}{2}\max\left(-\frac{2}{e}, \beta\right)\right)}; \beta = \frac{\ell_i - \tau}{\lambda} \quad \text{(Eqn. 4)}$$

in which W is the Lambert W function.

In some embodiments implemented according to the foregoing, ML up-weights easier samples dynamically during the training. Hence, summarization tasks (e.g., abstractive summarization) are able to implement a curriculum learning approach. Advantageously, up-weighting easier samples improves the performance of the language model and its generalization ability by reducing the risk of converging to local optima, rather than to the global optimum.

Example Quantitative and Qualitative Comparisons

Enhancing sentential saliency of an input sequence and/or dynamically prioritizing easier samples during training as described contribute toward improved performance of language models trained according to aspects of the present disclosure, over baseline models.

In some cases, models trained according to the approach disclosed herein are associated with higher metrics, such as those shown in Tables 1 and 2.

TABLE 1

Models trained on a first test dataset for 8 epochs with highest ROUGE-L scores in inference time.

| Summarization Models | ROUGE-1 | ROUGE-2 | ROUGE-L |
|---|---|---|---|
| Baseline Model 1 | 20.32 | 4.81 | 13.77 |
| Baseline Model 2 | 21.92 | 4.99 | 14.21 |
| Baseline Model 3 | 22.14 | 6.01 | 14.66 |
| Baseline Model 4 | 26.63 | 9.01 | 21.60 |
| Baseline Model 5 | 28.80 | 9.02 | 23.02 |
| Example Model | 30.27 | 10.16 | 24.27 |

TABLE 2

Models trained on a second test dataset for 5 epochs with highest ROUGE-L scores in inference time.

| Summarization Models | ROUGE-1 | ROUGE-2 | ROUGE-L |
|---|---|---|---|
| Baseline Model 5 | 20.73 | 6.79 | 17.22 |
| Example Model | 22.12 | 6.91 | 17.97 |

In addition, in some cases, the models trained according to the approach disclosed herein are also associated with higher qualitative measures—fluency (readability), informativeness, and overall quality—as shown in Tables 3 and 4. It has been found that, in some cases, the models trained according to the disclosed approach outperforms an existing conventional model as well as human-written summaries under certain criteria such as informativeness, and overall quality, substantiating the usefulness of language models trained according to methods described herein.

TABLE 3

Average human evaluation scores (1 through 5) gained by each summarization model in terms of qualitative criteria.

| Summarization Models | Fluency | Informativeness | Overall Quality |
|---|---|---|---|
| Baseline Model 5 | 4.48 | 3.76 | 3.75 |
| Example Model | 4.45 | 3.91 | 3.98 |
| Human | 4.50 | 3.72 | 3.70 |

TABLE 4

Fleiss' Kappa agreement rates for qualitative criteria for each summarization model.

| Summarization Models | Fluency | Informativeness | Overall Quality |
|---|---|---|---|
| Baseline Model 5 | 12% | 26% | 21% |
| Example Model | 14% | 33% | 25% |
| Human | 11% | 24% | 20% |

See, for example, FIG. 4. This example shows a comparison among a source text (split by <s> and </s> tokens), an abstractive summary generated by a prior language model, abstractive summaries generated by two models trained according to the methods descried herein, and ground-truth summary by a human annotator.

Figure 5A:
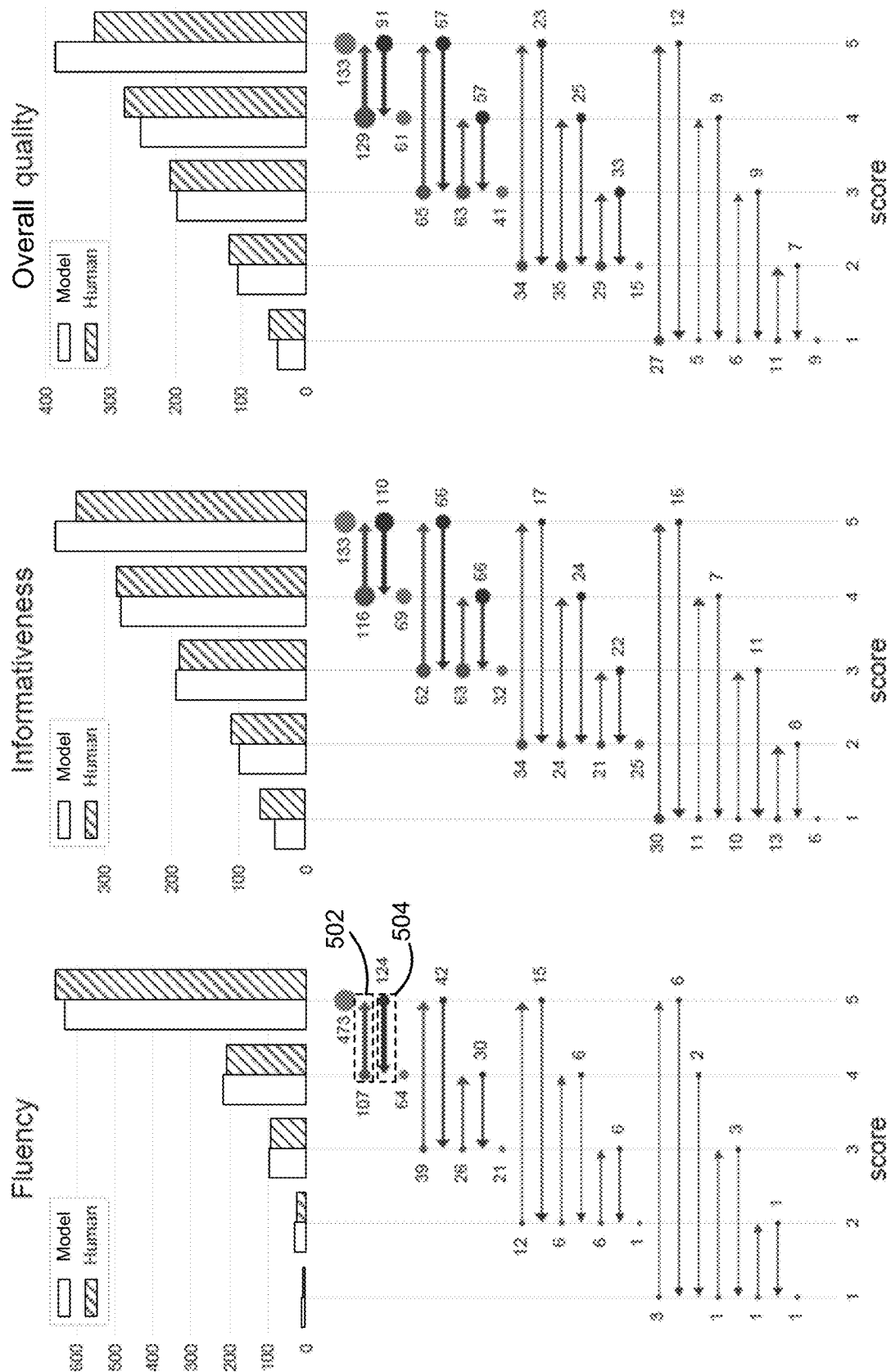
FIGS. 5A and 5B illustrate histograms and arrow plots depicting score transitions between manually scored summaries, obtained from example experimental studies.
Figure 5B:
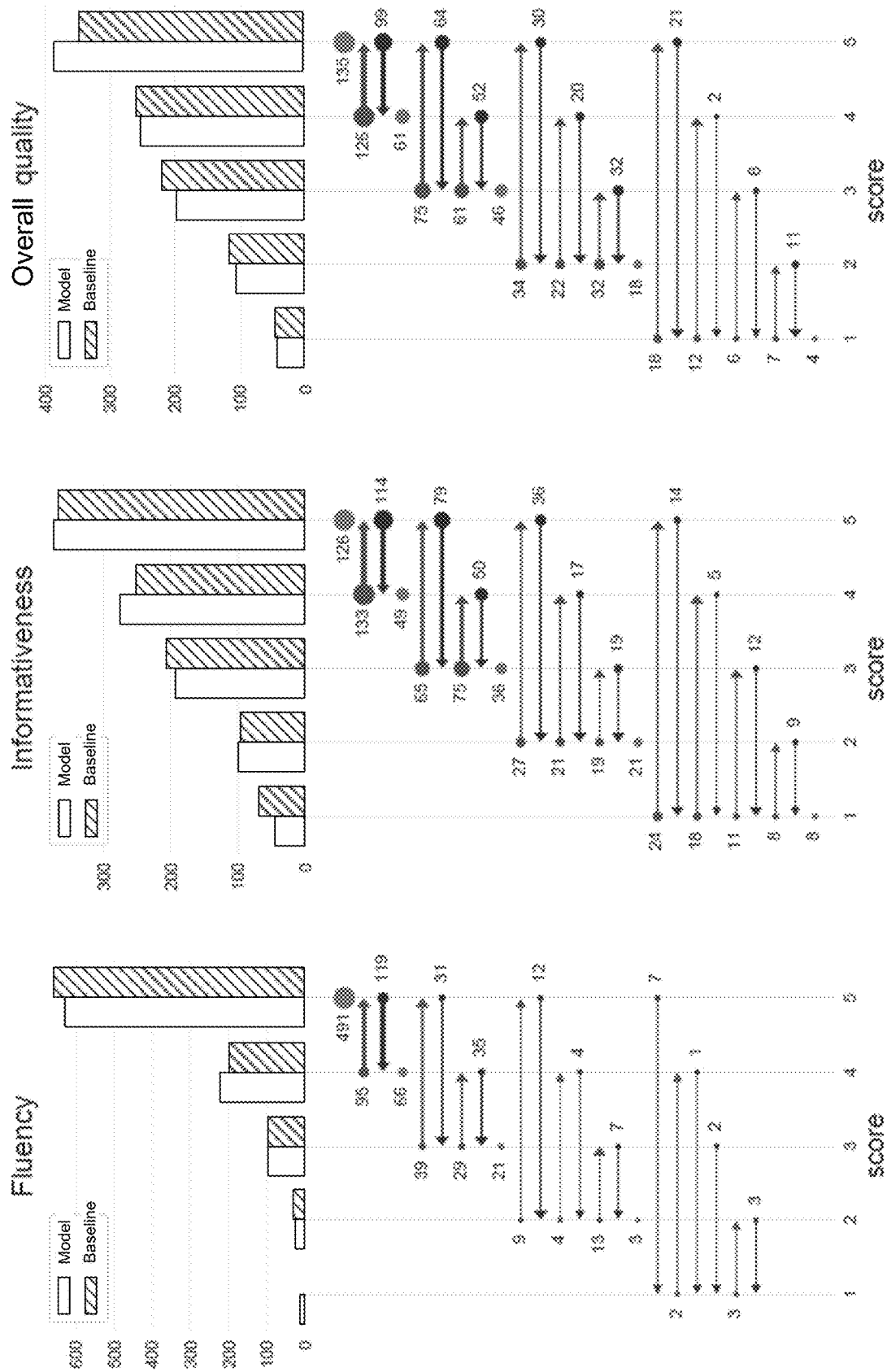

FIGS. 5A and 5B illustrate histograms and arrow plots depicting score transitions between manually scored summaries, obtained from example experimental studies. FIG. 5A illustrates histograms of scores assigned by human evaluators for summaries generated according to some embodiments herein ("model-generated" summaries) and summaries generated by humans. FIG. 5A also compares human evaluations between model-generated summaries and human-generated summaries. For every sample evaluated, a score difference was determined. That is, for every source text, a human-generated summary and a model-generated summary were produced. The arrow plots indicate a difference in score between the two summaries. For example, in one sample, a human evaluator assigned a score of 4 in fluency for the human-generated summary and a higher score of 5 in fluency for the model-generated summary. The 1-point difference and improvement from the human-generated summary to the model-generated summary is indicated by the arrow 502. Furthermore, there were 107 such improvements using the model-generated summary. Conversely, there were 124 instances where the human-generated summary for a given sample received a 5 and the model-generated summary for the given sample received a 4, as indicated by the arrow 504. Differences between other scores are similarly indicated by the arrows between scores of 1 through 5 for each qualitative category of fluency, informativeness, and overall quality. FIG. 5B compares human evaluations between summaries generated according to some embodiments herein ("model-generated" summaries) and summaries generated according to a baseline language model. Based on these comparisons between human-generated summaries and baseline-generated summaries, strong gains in the model-generated summary's informativeness and overall quality are observed in some cases, in line with Tables 3 and 4 above. In some cases, the improvement is notable in enhancing scores from 4 to 5 in informativeness and overall quality metrics, probative of the improvements in content selection and efficiency in the training process.

Methods

Figure 6:
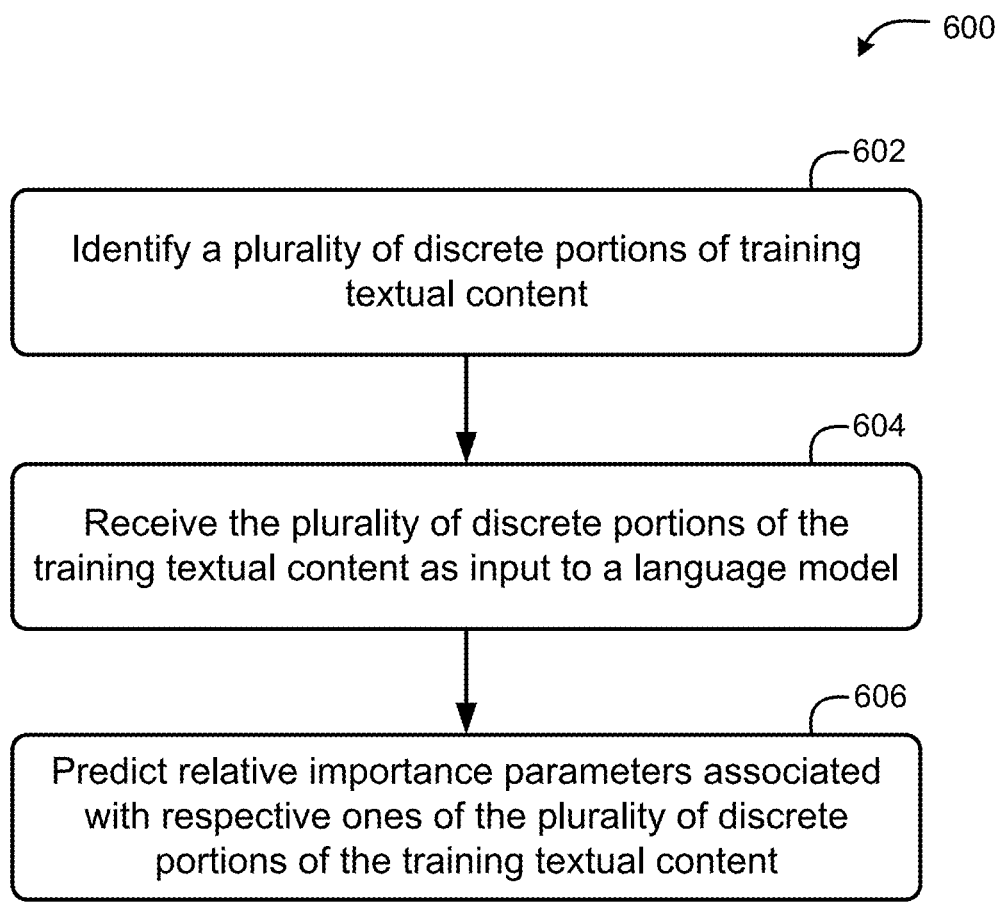
FIG. 6 is a flow diagram of a method for training a language model for performing abstractive text summarization, in accordance with some embodiments.
Figure 10:
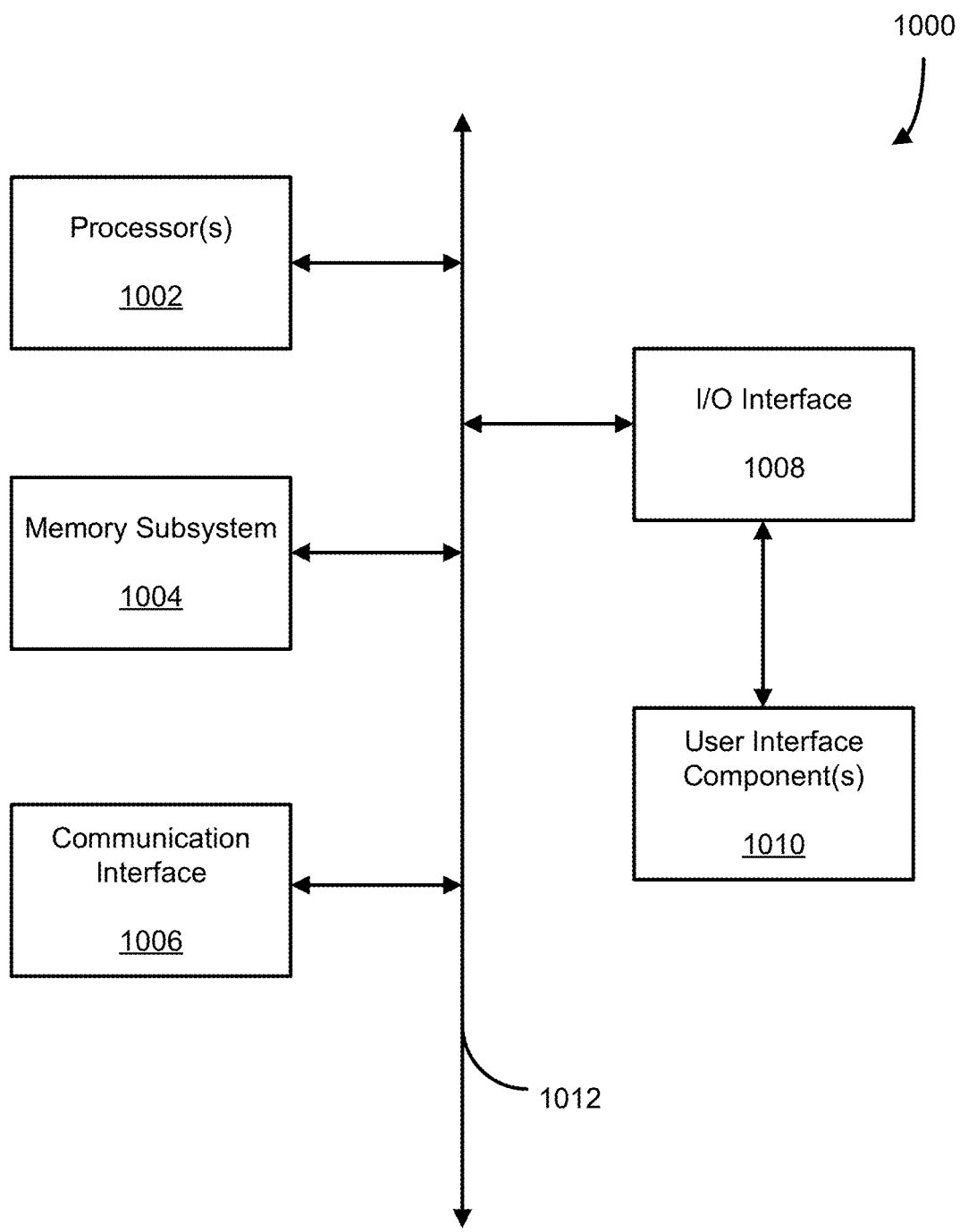
FIG. 10 shows a schematic diagram of an example computing device for implementing the methods, systems, and techniques described herein in accordance with some embodiments.

FIG. 6 is a flow diagram of a method 600 for training a language model for performing abstractive text summarization, in accordance with some embodiments. In some embodiments, the functionality illustrated in one or more of the steps shown in FIG. 6 is performed by hardware and/or software components of a suitable computerized system or apparatus, e.g., a user device (mobile or otherwise), a workstation, a server. In some implementations, the computerized system or apparatus is configured to operate the various components and modules implementing at least portions of the architecture of FIG. 2. In some aspects, a computer-readable apparatus including a storage medium stores computer-readable and computer-executable instructions that are configured to, when executed by at least one processor apparatus, cause the at least one processor apparatus or another apparatus (e.g., the computerized apparatus) to perform the operations of the method 600. Example components of the computerized apparatus are illustrated in FIG. 10, which are described in more detail below.

It also should be noted that the operations of the method 600 may be performed in any suitable order, not necessarily the order depicted in FIG. 6. In some embodiments, at least some portions of the steps may be performed substantially concurrently. Further, the method 600 may include additional or fewer operations than those depicted in FIG. 6 to accomplish the training.

At step 602, the method 600 includes identifying a plurality of discrete portions of training textual content. In some embodiments, each of the plurality of discrete portions comprises a sentence within the training textual content. In various embodiments, the training textual content includes a source text containing multiple words, sentences, paragraphs, pages, etc. Implementations of the techniques disclosed herein aim to increase the awareness of sentential saliency. Hence, in such implementations, sentences are identified within the training textual content.

In some embodiments, the identifying of the plurality of discrete portions of the training textual content includes appending one or more of (i) a first tag to a start of the sentence or (ii) a second tag to an end of the sentence. In some implementations, the first tag may be a BOS token, and the second tag may be an EOS token. That is, an <s> token may be added to the start of the sentence, and a </s> token may be added to the end of the sentence. In some cases, only the EOS tokens are added to identify the sentences. In some cases, only the BOS tokens are added to identify the sentences. In some cases, both the BOS and EOS tokens may be added to identify the sentences.

In some implementations, the appending of the first and/or second tags to the discrete portions (e.g., sentences) results in generation of a modified training textual content, where the modified training textual content includes the one or more of the first tag or the second tag appended to each sentence of the plurality of sentences, resulting in, e.g., the modified input sequence R'=[<s>sent$_1$</s><s>sent$_2$</s> . . . <s>sent$_n$</s>] as described above.

At step 604, the method 600 includes receiving the plurality of discrete portions of the training textual content as input to the language model. In some embodiments, the modified training textual content (e.g., the modified input sequence R') is received by the language model at, e.g., an encoder stack 210 (as shown in FIG. 2).

At step 606, the method 600 includes predicting relative importance parameters associated with respective ones of the plurality of discrete portions of the training textual content. In some embodiments, the relative importance parameter is based at least on one or more linguistic similarity measures with respect to a ground truth. In some implementations, the linguistic similarity measures include one or more Recall-Oriented Understudy for Gisting Evaluation (ROUGE) metrics, e.g., ROUGE-1, ROUGE-2, ROUGE-L, etc. In some cases, the relative importance parameter is a normalized mean of ROUGE-2 and ROUGE-L scores of sentences from the source text with respect to the ground truth summary, which may be determined using Eqn. 1, for example. In some cases, the relative importance parameter is a mean of two or more other ROUGE metrics, or based on one ROUGE metric. In other cases, accuracy metrics such as precision, recall, and/or F1 scores may be a basis for the relative importance parameter, alternatively or in conjunction with ROUGE metrics.

In some embodiments, a relative importance parameter correlates to a probability of a saliency of a discrete portion (e.g., sentence). Based on the relative importance parameters, the language model learns sentential saliency associated with the training textual content. For example, the higher a relative importance parameter for a given sentence, the higher the saliency of the given sentence. The given sentence can then be selected for inclusion in the output generated summary, given sufficient (e.g., above a prescribed threshold) saliency or relative importance parameter.

In some embodiments, the relative importance parameter is evaluated with a target dataset through a loss function to minimize the error. This trains the language model to predict the relative importance parameter and contributes to increasing sentential saliency during inference. In some embodiments, the output summary itself is evaluated through a loss function to minimize the error.

Figure 7:
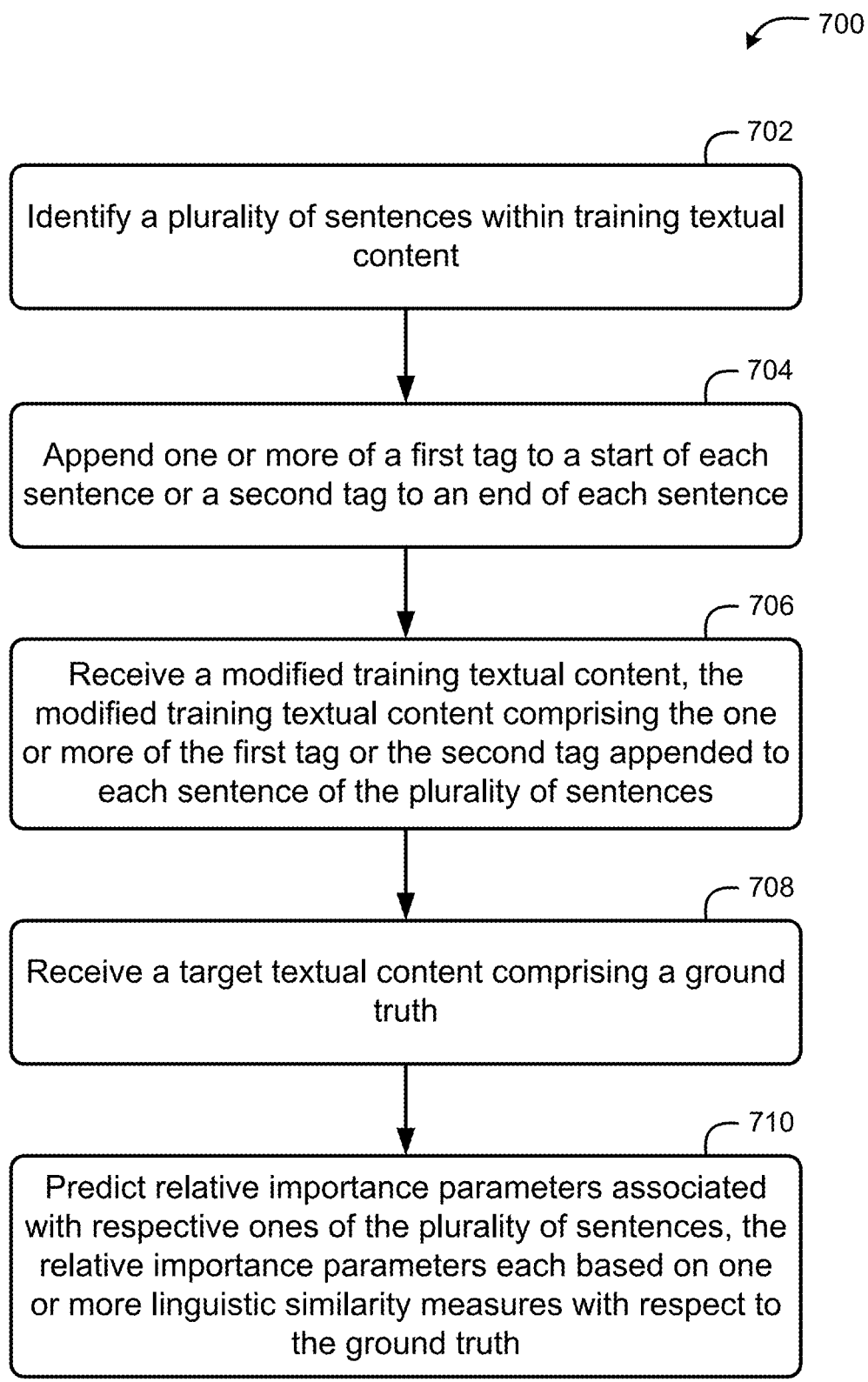
FIG. 7 is a flow diagram of a method for training a language model for performing abstractive text summarization, in accordance with some embodiments.

FIG. 7 is a flow diagram of a method 700 for training a language model for performing abstractive text summarization, in accordance with some embodiments. In some embodiments, the functionality illustrated in one or more of the steps shown in FIG. 7 is performed by hardware and/or software components of a suitable computerized system or apparatus, e.g., a user device (mobile or otherwise), a workstation, a server. In some implementations, the computerized system or apparatus is configured to operate the various components and modules implementing at least portions of the architecture of FIG. 2. In some aspects, a computer-readable apparatus including a storage medium stores computer-readable and computer-executable instructions that are configured to, when executed by at least one processor apparatus, cause the at least one processor apparatus or another apparatus (e.g., the computerized apparatus) to perform the operations of the method 700. Example components of the computerized apparatus are illustrated in FIG. 10, which are described in more detail below.

It also should be noted that the operations of the method 700 may be performed in any suitable order, not necessarily the order depicted in FIG. 7. In some embodiments, at least some portions of the steps may be performed substantially concurrently. Further, the method 700 may include additional or fewer operations than those depicted in FIG. 7 to accomplish the training.

At step 702, the method 700 includes identifying a plurality of sentences within training textual content. In various embodiments, the training textual content includes a source text containing multiple words, sentences, paragraphs, pages, etc. Implementations of the techniques disclosed herein aim to increase the awareness of sentential saliency. Hence, in such implementations, sentences are identified within the training textual content.

At step 704, the method 700 includes appending one or more of a first tag to a start of each sentence or a second tag to an end of each sentence. In some embodiments, as noted elsewhere herein, the appended tags may be a BOS token (e.g., <s>) and/or an EOS token (e.g., </s>). In some implementations, the appending of the first and/or second tags to the sentences results in generation of a modified training textual content, where the modified training textual content includes the one or more of the first tag or the second tag appended to each sentence of the plurality of sentences, resulting in, e.g., the modified input sequence R'= [<s>sent$_1$</s><s>sent$_2$</s> . . . <s>sent$_n$</s>] as described above.

At step 706, the method 700 includes receiving the modified training textual content, the modified training textual content comprising the one or more of the first tag or the second tag appended to each sentence of the plurality of sentences. In some embodiments, a language model receives the modified training textual content as an input at an encoder stack, such as encoder 210 as shown in FIG. 2.

At step 708, the method 700 includes receiving a target training textual content including a ground truth. In some embodiments, the language model receives the target training textual content at a decoder stack, such as decoder 220 as shown in FIG. 2. In some embodiments, the decoder 220 includes multiple self-attention layers (e.g., the first and second self-attention layers 224, 226 as shown in FIG. 2), which are configured to relate words to other words and sentences to other sentences, as described elsewhere above.

At step 710, the method 700 includes predicting relative importance parameters associated with respective ones of the plurality of sentences, the relative importance parameters each based on one or more linguistic similarity measures with respect to the ground truth. In some implementations, the linguistic similarity measures include one or more ROUGE metrics, e.g., ROUGE-1, ROUGE-2, ROUGE-L, etc. In some cases, the relative importance parameter is a normalized mean of ROUGE-2 and ROUGE-L scores of sentences from the source text with respect to the ground truth summary, which may be determined using Eqn. 1, for example. In some cases, the relative importance parameter is a mean of two or more other ROUGE metrics, or based on one ROUGE metric. In other cases, accuracy metrics such as precision, recall, and/or F1 scores may be a basis for the relative importance parameter, alternatively or in conjunction with ROUGE metrics. In some embodiments, a relative importance parameter correlates to a probability of a saliency of a sentence.

In some embodiments, the differentiable vector renderer rasterizes the new vector paths to generate an untextured raster image, e.g., in grayscale. Based on the relative importance parameters, the language model learns sentential saliency associated with the training textual content, as described with respect to step 706.

Figure 8:
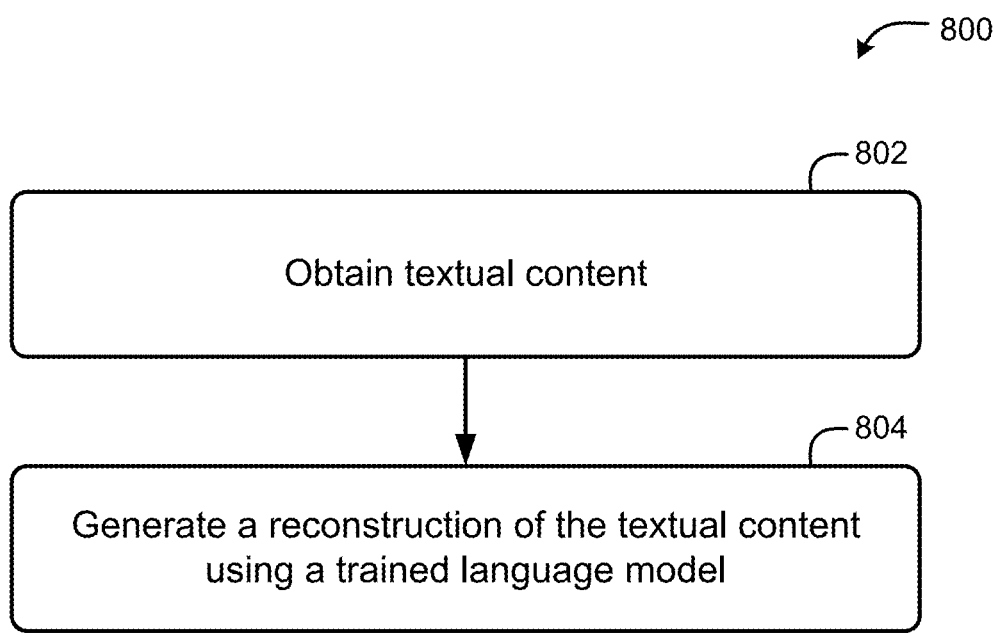
FIG. 8 is a flow diagram of a method for performing abstractive text summarization, in accordance with some embodiments.

FIG. 8 is a flow diagram of a method 800 for performing abstractive text summarization, in accordance with some embodiments. In some embodiments, the functionality illustrated in one or more of the steps shown in FIG. 8 is performed by hardware and/or software components of a suitable computerized system or apparatus, e.g., a user device (mobile or otherwise), a workstation, a server. In some implementations, the computerized system or apparatus is configured to operate the various components and modules implementing at least portions of the architecture of FIG. 2. In some aspects, a computer-readable apparatus including a storage medium stores computer-readable and computer-executable instructions that are configured to, when executed by at least one processor apparatus, cause the at least one processor apparatus or another apparatus (e.g., the computerized apparatus) to perform the operations of the method 800. Example components of the computerized apparatus are illustrated in FIG. 10, which are described in more detail below.

It also should be noted that the operations of the method 800 may be performed in any suitable order, not necessarily the order depicted in FIG. 8. In some embodiments, at least some portions of the steps may be performed substantially concurrently. Further, the method 800 may include additional or fewer operations than those depicted in FIG. 8 to accomplish the training.

At step 802, the method 800 includes obtaining textual content. In various embodiments, the textual content includes a source text containing multiple words, sentences, paragraphs, pages, etc.

At step 804, the method 800 includes generating a reconstruction of the textual content using a trained language model. In some embodiments, the reconstruction of the textual content is an abstractive summary of the textual content. In some embodiments, the trained language model has been trained according to at least a portion of the steps described with respect to method 600 or 700.

As an example, an input sequence including several sentences is provided to a language model that has been trained according to some methods described herein. Based at least in part on sentential saliency which that the language model has gained awareness of, the language model outputs an abstractive summary that are, in some cases, associated with fluency (readability), informativeness, and/or overall quality that are comparable or better than summaries produced by existing models (such as 104 as shown in FIG. 1) or human-written summaries.

Figure 9:
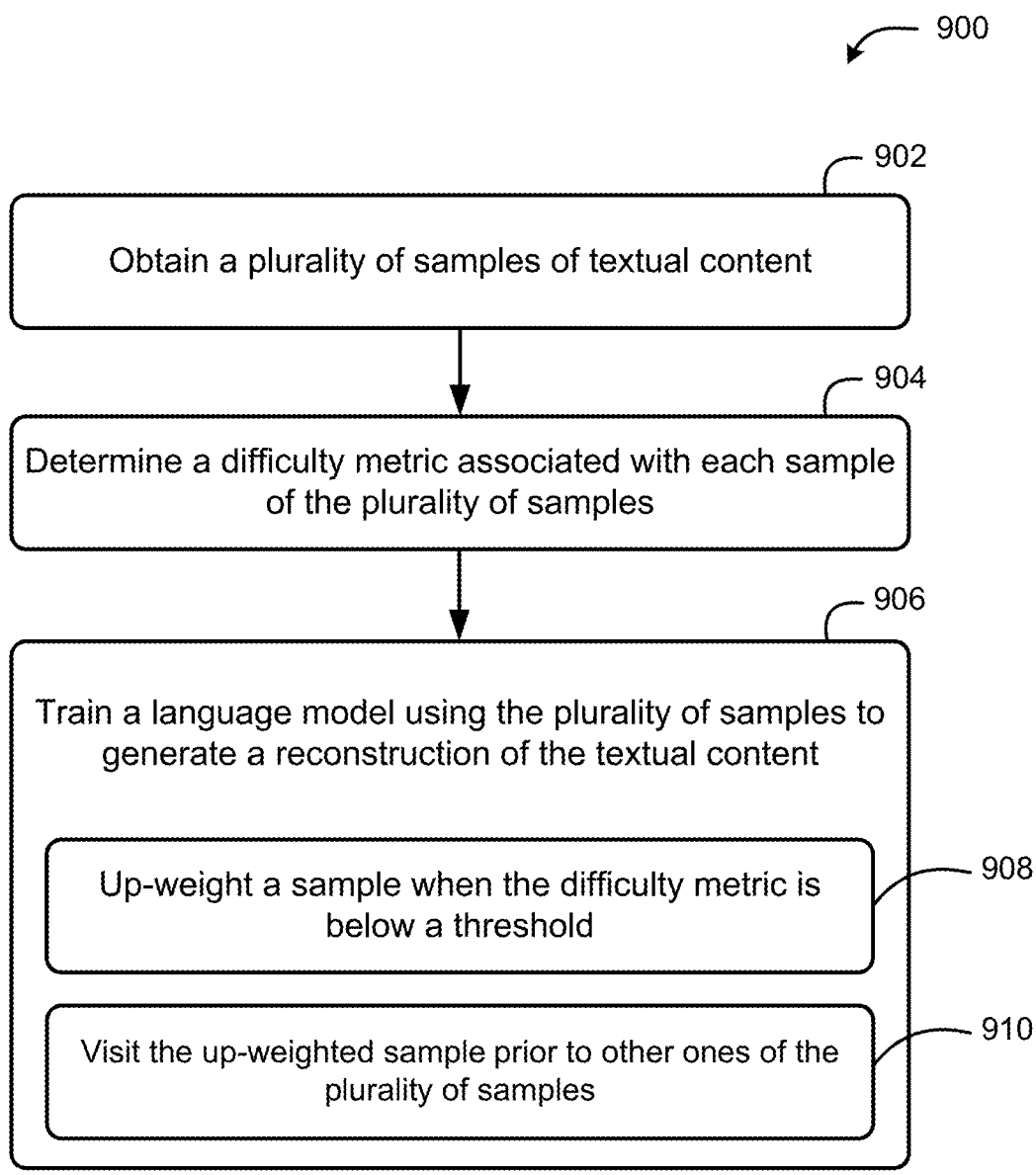
FIG. 9 is a flow diagram of a method for training a language model for abstractive summarization of textual content, in accordance with some embodiments.

FIG. 9 is a flow diagram of a method 900 for training a language model for abstractive summarization of textual content, in accordance with some embodiments. In some embodiments, the functionality illustrated in one or more of the steps shown in FIG. 9 is performed by hardware and/or software components of a suitable computerized system or apparatus, e.g., a user device (mobile or otherwise), a workstation, a server. In some implementations, the computerized system or apparatus is configured to operate the various components and modules implementing at least portions of the architecture of FIG. 3. In some aspects, a computer-readable apparatus including a storage medium stores computer-readable and computer-executable instructions that are configured to, when executed by at least one processor apparatus, cause the at least one processor apparatus or another apparatus (e.g., the computerized apparatus) to perform the operations of the method 900. Example components of the computerized apparatus are illustrated in FIG. 10, which are described in more detail below.

It also should be noted that the operations of the method 900 may be performed in any suitable order, not necessarily the order depicted in FIG. 9. In some embodiments, at least some portions of the steps may be performed substantially concurrently. Further, the method 900 may include additional or fewer operations than those depicted in FIG. 9 to accomplish the training.

At step 902, the method 900 includes obtaining a plurality of samples of textual content. In various embodiments, the textual content includes a source text containing multiple words, sentences, paragraphs, pages, etc. In some embodiments, a sample corresponds to at least a portion of the textual content. As one example, a sample may be at least a paragraph of source text. In another example, a sample corresponds to a social media post.

At step 904, the method 900 includes determining a difficulty metric associated with each sample of the plurality of samples. In some embodiments, the difficulty metric is based on a loss-upon-loss ("meta-loss") function that takes in a task loss and a confidence parameter with respect to an input. Such a function is described by Eqn. 2.

At step 906, the method 900 includes training the language model using the plurality of samples, the trained language model configured to generate a reconstruction of the textual content. In some embodiments, reconstruction of the textual content includes abstractive summarization of the textual content. In some embodiments, the training of the language model includes providing training samples to a neural network (e.g., 322). In some implementations, the neural network includes an encoder (e.g., 210) configured to receive a model-generated summary of a sample, and a decoder (e.g., 220) configured to receive a target (ground-truth) summary of the sample. Loss can then be determined with respect to the ground-truth summary. In some embodiments, the training of the language model includes steps 908 and 910 below.

At step 908, the method 900 includes up-weighting a sample when the difficulty metric is below a threshold. In some embodiments, the training of the language model in step 906 includes the up-weighting. In some embodiments, the threshold is predetermined to a specific difficulty level or value. In such a case, it is possible that all of the samples are considered too difficult to be used in training if the difficulty metrics of all samples are above the predetermined threshold. That is, the samples may have an unacceptable level of risk of causing the training to converge merely to local optima. In some embodiments, however, the threshold is dynamically determined and correlated to another measure, such as a statistical measurement, such as an average, mean, median, etc. For example, the difficulty metrics relating to all or some of the samples is determined (e.g., one or more other samples), and the threshold is set to the average of the difficulty metrics. As another example, the threshold is set to the difficulty metric of a selected one of the samples after determination of the difficulty metrics of all of the samples. In some cases, there are multiple thresholds. Having multiple thresholds can be useful for treating samples differently, e.g., where some samples are used for training before a second group of samples, and a third group of samples is discarded and not used in training. The threshold can be adjusted over time; e.g., threshold can be increased.

In some embodiments, if the difficulty metric of a sample (based on the meta-loss) is determined to be below that of one or more other samples, then that sample is weighted higher than other samples. In some embodiments, if the difficulty metric of the sample is determined to be below the threshold, then that sample is weighted higher than other samples. In some cases, the threshold is the difficulty metric of the one or more other samples. In some implementations, up-weighting brings the sample ahead of other samples and are used in training first (step 910). In some implementations, up-weighting increases the parameters(s) or weight(s) associated with the sample during determination of loss (e.g., 324) or optimization of meta-loss (e.g., via optimizer module 330).

At step 910, the method 900 includes visiting the up-weighted sample prior to other ones of the plurality of samples. In some embodiments, the training of the language model in step 906 includes the visiting of the up-weighted sample prior to other ones of the plurality of samples, thereby reducing the risk of getting stuck in local optima.

In some implementations, a language model trained according to method 700 is used to generate a reconstruction of textual content. In some cases, the reconstruction of textual content includes performance of abstractive summarization of textual content.

Apparatus

FIG. 10 shows a schematic diagram of components of a computing device 1000 that is implemented in a computing system in accordance with some implementations. As illustrated, computing device 1000 includes a bus 1012 that directly or indirectly couples one or more processors(s) 1002, a memory subsystem 1004, a communication interface 1006, an input/output (I/O) interface 1008, and/or one or more user interface components 1010. It should be noted that, in some embodiments, various other components are included in a computing device that are not shown in FIG. 10, and/or one or more components shown in FIG. 10 are omitted.

In some embodiments, computing device 1000 includes or is coupled to a memory subsystem 1004. Memory subsystem 1004 includes a computer-readable medium (e.g., non-transitory storage medium) or a combination of computer-readable media. Examples of computer-readable media include optical media (e.g., compact discs, digital video discs, or the like), magnetic media (e.g., hard disks, floppy disks, or the like), semiconductor media (e.g., flash memory, dynamic random access memory (DRAM), static random access memory (SRAM), electrically programmable read-only memory (EPROM), electrically erasable programmable read-only memory (EEPROM), or the like), or a combination thereof. In some embodiments, the computer-readable media includes non-volatile memory, volatile memory, or a combination thereof. In some embodiments, memory subsystem 1004 also includes one or more hardware devices such as a solid-state memory, one or more hard drives, one or more optical disk drives, or the like. In some embodiments, memory subsystem 1004 stores content files such as text-based files, audio files, image files, and/or video files, etc. In some implementations, the content files include documents, pictures, photos, songs, podcasts, movies, etc. In some embodiments, memory subsystem 1004 stores one or more computer program products that are each implemented as a set of instructions (e.g., program code) stored on a computer-readable medium.

A computer program product (e.g., a program stored in or downloadable onto a computer readable medium) includes instructions or program code that are executable by one or more processors (e.g., processor(s) 1002, or processor(s) of another computing device communicatively coupled to computing device 1000) to perform various operations or functions such as those described with reference to FIGS. 6-9. In some embodiments, a computer program product is referred to as a non-transitory computer readable medium storing or comprising instructions to perform certain operations or functions. Examples of a computer program product include firmware, software driver, operating system, or software application. Examples of a software application include data management application (e.g., file management application, document management application, media management application, database application, etc.), communication application (e.g., email application, messaging application, teleconference or meeting application, social media application, etc.), productivity application (e.g., document viewer application, document creation or editing application, etc.), media or interactive application (e.g., web browser, image or photo viewer, audio or video playback application, gaming application, virtual or augmented reality application, shopping application, recommendation or review application, etc.), creativity application (e.g., image, drawing, photo, audio, or video creation or editing application, web page development application, virtual or augmented reality creation or editing application, graphic design application, etc.), or the like.

In some embodiments, a computer program product such as any of the example software application are implemented using one or more neural network or machine learning models. In such embodiments, one or more neural network or matching learning models are trained using computing device 1000 (or a computing system that includes computing device 1000). Furthermore, in some implementations, computing device 1000 (or a computing system include computing device 1000) executes the one or more neural network or machine learning models as part of the computer program product to perform inference operations. It should be noted, in some embodiments, the neural network or matching learning model(s) are trained using a computing device or system that is the same as, overlaps with, or is separate from the computing device or system performing inference operations.

Communication interface 1006 is used by computing device 1000 to communicate with one or more communication networks, and/or other electronic device(s). Example types of communication networks include wired communication networks and/or wireless communication networks. Example types of communication networks include the Internet, a wide-area network, a local-area network, a virtual private network (VPN), an Intranet, or the like. In some embodiments, communication interface 1006 utilizes various drivers, wireless communication circuitry, network interface circuitry, or the like to enable communication via various communication networks.

I/O interface 1008 includes various drivers and/or hardware circuitry for receiving input from various input devices, providing output to various output devices, or exchanging input/output with various input/output devices. Examples of devices coupled to I/O interface 1008 include peripheral devices such as a printer, a docking station, a communication hub, a charging device, etc. In some implementations, some devices coupled to I/O interface 1008 are used as user interface component(s) 1010. In one example, a user operates input elements of user interface component(s) 1010 to invoke the functionality of computing device 1000 and/or of another device communicatively coupled to computing device 1000; a user views, hears, and/or otherwise experiences output from computing device 1000 via output elements of user interface component(s) 1010. Some user interface component(s) 1010 provide both input and output functionalities. Examples of input user interface component include a mouse, a joystick, a keyboard, a microphone, a camera, or the like. Examples of output user interface component include a display screen (e.g., a monitor, an LCD display, etc.), one or more speakers, or the like. Examples of a user interface components provide both input and output functionalities include a touchscreen, haptic feedback controllers, or the like.

Various embodiments are described herein which are intended to be illustrative. Alternative embodiments may be apparent to those of ordinary skill in the art without departing from the scope of the disclosure. In one example, one or more features from one embodiment are combined with another embodiment to form an alternative embodiment. In another example, one or more features are omitted from an embodiment to form an alternative embodiment without departing from the scope of the disclosure. Additionally, it should be noted that, in some implementations, certain features described herein are utilized without reference to other features described herein.

With reference to the various processes described above, it should be understood that the order in which operations are performed is not limited to the order described herein. Moreover, in some embodiments, two or more operations are performed concurrently and/or substantially in parallel. In some embodiments, what is described as a single operation is split into two or more operations (e.g., performed by the same device, performed by two or more different devices, etc.). In some embodiments, what is described as multiple operations is combined into a single (e.g., performed by the same device, etc.). Descriptions of various blocks, modules, or components as distinct should not be construed as requiring that the blocks, modules, or components be separate (e.g., physically separate) and/or perform separate operations. For example, in some implementations, two or more blocks, modules, and/or components are merged. As another example, a single block, module, and/or components is split into multiple blocks, modules, and/or components.

The phrases "in one embodiment," "in an embodiment," "in one example," and "in an example" are used herein. It should be understood that, in some cases, these phrases refer to the same embodiments and/or examples, and, in other cases, these phrases refer to different embodiments and/or examples. The terms "comprising," "having," and "including" should be understood to be synonymous unless indicated otherwise. The phases "A and/or B" and "A or B" should be understood to mean $\{A\}$, $\{B\}$, or $\{A, B\}$. The phrase "at least one of A, B, or C" and "at least one of A, B, and C" should each be understood to mean $\{A\}$, $\{B\}$, $\{C\}$, $\{A, B\}$, $\{A, C\}$, $\{B, C\}$, or $\{A, B, C\}$.

What is claimed is:

1. A method of performing abstractive text summarization, the method comprising:
obtaining textual content; and
generating a reconstruction of the textual content using a trained language model, the reconstructed textual content comprising an abstractive summary of the textual content generated based on relative importance parameters associated with respective portions of the textual content;
wherein the trained language model comprises a language model that has been trained by:
identifying a plurality of discrete portions of training textual content;
receiving the plurality of discrete portions of the training textual content as input to the language model; and
predicting relative importance parameters associated with respective ones of the plurality of discrete portions of the training textual content, the relative importance parameters each being based at least on one or more linguistic similarity measures with respect to a ground truth, the relative importance parameters each correlating to a probability of a saliency of a respective discrete portion; and
wherein the language model comprises:
an encoder comprising a first self-attention layer configured to determine a relationship between a portion and one or more other portions of the training textual content; and
a decoder comprising:
a second self-attention layer configured to determine a relationship between a word and one or more other words of the ground truth; and
a third self-attention layer configured to determine a relationship between a sentence and one or more other sentences of the ground truth.

2. The method of claim 1, wherein:
the one or more linguistic similarity measures comprise a first Recall-Oriented Understudy for Gisting Evaluation (ROUGE) metric and a second ROUGE metric, the first and second ROUGE metrics having different granularities associated with a comparison between the respective discrete portion and the ground truth; and
the relative importance parameters each comprise a mean of the first ROUGE metric and the second ROUGE metric.

3. The method of claim 2, wherein the first ROUGE metric comprises ROUGE-2, and the second ROUGE metric comprises ROUGE-L.

4. The method of claim 1, wherein:
each of the plurality of discrete portions comprises a sentence within the textual content;
the identifying of the plurality of discrete portions of the training textual content comprises appending one or more of (i) a first tag to a start of the sentence or (ii) a second tag to an end of the sentence; and
the receiving of the plurality of discrete portions of the training textual content as input comprises receiving a modified training textual content, the modified training textual content comprising the one or more of the first tag or the second tag appended to each of the plurality of discrete portions.

5. The method of claim 4, wherein the training of the language model further comprises learning sentential saliency associated with the training textual content based on the relative importance parameters;
wherein generation of the abstractive summary is further based on the sentential saliency.

6. The method of claim 1, wherein the ground truth comprises a user-written summary of the training textual content.

7. The method of claim 1, wherein the language model comprises a neural network, the neural network comprising the encoder and the decoder.

8. A method of training a language model for abstractive summarization of textual content, the method comprising:
obtaining a plurality of samples of textual content;
determining a difficulty metric associated with each sample of the plurality of samples; and
training the language model using the plurality of samples using the plurality of samples of textual content and ground truth content, wherein the language model comprises an encoder comprising a first self-attention layer configured to determine a relationship between a portion and one or more other portions of the plurality of samples of textual content, and a decoder comprising a second self-attention layer configured to determine a relationship between a word and one or more other words of the ground truth content, and a third self-attention layer configured to determine a relationship between a sentence and one or more other sentences of the ground truth content, the trained language model configured to generate a reconstruction of the textual content, the training comprising:
up-weighting a sample when the difficulty metric is below a threshold; and
visiting the up-weighted sample prior to one or more other ones of the plurality of samples.

9. The method of claim 8, wherein the determining of the difficulty metric is based at least on (i) a task loss associated with the sample and (ii) a confidence parameter of the sample, wherein the task loss is based on (i) an abstractive summary of the textual content from the language model and (ii) a ground-truth abstractive summary of the textual content.

10. The method of claim 9, wherein the determining of the difficulty metric is further based on a loss associated with the task loss.

11. The method of claim 8, wherein the reconstruction of the textual content comprises an abstract summarization of the textual content.

12. The method of claim 8, wherein the threshold comprises a predetermined threshold or a dynamically determined threshold, the dynamically determined threshold being based at least on one or more difficulty metrics associated with one or more other ones of the plurality of samples.

13. The method of claim 8, wherein the one or more other ones of the plurality of samples are each associated with a higher difficulty metric than the difficulty metric of the sample.

14. The method of claim 8, wherein the threshold is correlated to a difficulty metric associated with at least one of the one or more other ones of the plurality of samples.

15. A language transformer system comprising:
one or more processors;
a non-transitory computer-readable medium comprising a plurality of instructions; and
a neural network coupled to the one or more processors and the non-transitory computer-readable medium, the neural network implemented by a language model to:
obtain textual content; and
generate an abstractive summary of the textual content, the abstractive summary comprising a reconstruction of the obtained textual content;

wherein the language model has been trained by:
  obtaining a plurality of samples of textual content;
  determining a difficulty metric associated with each sample of the plurality of samples; and
  training the language model using the plurality of samples and ground truth, the trained language model configured to generate a reconstruction of the textual content, the training comprising:
    up-weighting a sample when the difficulty metric is below a threshold; and
    visiting the up-weighted sample prior to one or more other ones of the plurality of samples; and
wherein the language model comprises:
  an encoder comprising a first self-attention layer configured to determine a relationship between a portion and one or more other portions of the plurality of samples textual content; and
  a decoder comprising:
    a second self-attention layer configured to determine a relationship between a word and one or more other words of the ground truth; and
    a third self-attention layer configured to determine a relationship between a sentence and one or more other sentences of the ground truth.

16. The system of claim 15, wherein the determining of the difficulty metric is based at least on (i) a task loss associated with the sample and (ii) a confidence parameter of the sample, wherein the task loss is based on (i) an abstractive summary of the textual content from the language model and (ii) a ground-truth abstractive summary of the textual content.

17. The system of claim 16, wherein the determining of the difficulty metric is further based on a loss associated with the task loss.

18. The system of claim 15, wherein the threshold comprises a predetermined threshold or a dynamically determined threshold, the dynamically determined threshold being based at least on one or more difficulty metrics associated with one or more other ones of the plurality of samples.

19. The system of claim 15, wherein the one or more other ones of the plurality of samples are each associated with a higher difficulty metric than the difficulty metric of the sample.

* * * * *